US007249081B2

(12) United States Patent
Shearer et al.

(10) Patent No.: US 7,249,081 B2
(45) Date of Patent: Jul. 24, 2007

(54) LOAD AWARE OPTIMIZATION

(75) Inventors: James W. Shearer, San Francisco, CA (US); John G. Watson, Menlo Park, CA (US); Jason S. Scott, San Carlos, CA (US)

(73) Assignee: Financial Engines, Inc., Palo Alto, CA (US)

( * ) Notice: Subject to any disclaimer, the term of this patent is extended or adjusted under 35 U.S.C. 154(b) by 697 days.

(21) Appl. No.: 09/792,258

(22) Filed: Feb. 23, 2001

(65) Prior Publication Data

US 2002/0002521 A1 Jan. 3, 2002

Related U.S. Application Data

(60) Provisional application No. 60/184,408, filed on Feb. 23, 2000.

(51) Int. Cl.
*G06Q 40/00* (2006.01)

(52) U.S. Cl. .............................. 705/36; 705/35; 705/37

(58) Field of Classification Search ................. 705/35, 705/36, 37
See application file for complete search history.

(56) References Cited

U.S. PATENT DOCUMENTS

| 3,634,669 A | 1/1972 | Soumas et al. ............... 705/36 |
| 3,697,693 A | 10/1972 | Deschenes et al. ........... 705/36 |
| 4,007,355 A | 2/1977 | Moreno ........................ 705/36 |
| 4,334,270 A | 6/1982 | Towers ......................... 705/36 |
| 4,346,442 A | 8/1982 | Musmanno ................... 705/35 |
| 4,376,978 A | 3/1983 | Musmanno ................... 705/35 |
| 4,597,046 A | 6/1986 | Musmanno et al. .......... 705/35 |
| 4,642,767 A | 2/1987 | Lerner ......................... 705/36 |
| 4,648,037 A | 3/1987 | Valentino .................... 364/408 |

(Continued)

FOREIGN PATENT DOCUMENTS

EP 0 572 281 A1 12/1993

(Continued)

OTHER PUBLICATIONS

Carino, "Combining Attribution Effect Over Time", The Journal of Performance Measurement, Summer 1999.*

(Continued)

*Primary Examiner*—Nga Nguyen
(74) *Attorney, Agent, or Firm*—Hamilton, DeSanctis & Cha, LLP

(57) ABSTRACT

A process utilizing a modification to the inputs to a standard portfolio optimization is provided for facilitating load aware optimizations. First, each loaded financial product, such as a mutual fund having a front end or back end load, of a set of available financial products is modeled as a loaded portion and an unloaded portion by determining an adjusted return. The adjusted return is based on a period the load bearing financial product is projected to be held in a portfolio and the amount of the load. A variable relating the fraction of a loaded financial product in the portfolio may be decomposed into two variables (one representing the loaded portion and another representing the unloaded portion) to regain the quadratic programming problem. The optimization may then be performed using quadratic programming techniques, and the fraction of each loaded financial product in the portfolio is calculated by combining the two variables.

33 Claims, 10 Drawing Sheets

U.S. PATENT DOCUMENTS

| | | | |
|---|---|---|---|
| 4,722,055 A | 1/1988 | Roberts | 705/36 |
| 4,742,457 A | 5/1988 | Leon et al. | 364/408 |
| 4,752,877 A | 6/1988 | Roberts et al. | 705/36 |
| 4,774,663 A | 9/1988 | Musmanno et al. | 705/35 |
| 4,868,376 A | 9/1989 | Lessin et al. | 705/36 |
| 4,876,648 A | 10/1989 | Lloyd | 705/36 |
| 4,885,685 A | 12/1989 | Wolfberg et al. | 705/36 |
| 4,910,676 A | 3/1990 | Alldredge | 705/36 |
| 4,933,842 A | 6/1990 | Durbin et al. | 705/36 |
| 4,953,085 A | 8/1990 | Atkins | 705/36 |
| 4,989,141 A | 1/1991 | Lyons et al. | 705/36 |
| 5,025,138 A | 6/1991 | Cuervo | 705/36 |
| 5,101,353 A | 3/1992 | Lupien et al. | 364/408 |
| 5,126,936 A | 6/1992 | Champion et al. | 364/408 |
| 5,132,899 A | 7/1992 | Fox | 364/408 |
| 5,148,365 A | 9/1992 | Dembo | 364/402 |
| 5,220,500 A | 6/1993 | Baird et al. | 705/36 |
| 5,222,019 A | 6/1993 | Yoshino et al. | 364/408 |
| 5,227,967 A | 7/1993 | Bailey | 705/36 |
| 5,237,500 A | 8/1993 | Perg et al. | 364/408 |
| 5,454,104 A | 9/1995 | Steidlmayer et al. | 705/36 |
| 5,471,575 A | 11/1995 | Glansante | 395/144 |
| 5,523,942 A | 6/1996 | Tyler et al. | 364/401 |
| 5,553,212 A | 9/1996 | Etoh | |
| 5,563,783 A | 10/1996 | Stolfo et al. | 364/408 |
| 5,590,037 A | 12/1996 | Ryan et al. | 395/204 |
| 5,592,379 A | 1/1997 | Finfrock et al. | 395/239 |
| 5,644,727 A | 7/1997 | Atkins | 705/36 |
| 5,692,233 A | 11/1997 | Garman | 705/36 |
| 5,784,696 A | 7/1998 | Melnikoff | 705/36 |
| 5,799,287 A * | 8/1998 | Dembo | 705/36 |
| 5,806,049 A | 9/1998 | Petruzzi | 705/36 |
| 5,812,987 A | 9/1998 | Luskin et al. | 705/36 |
| 5,819,238 A | 10/1998 | Fernholz | 705/36 |
| 5,839,804 A | 11/1998 | Ho | 312/223.2 |
| 5,864,827 A | 1/1999 | Wilson | 705/35 |
| 5,864,828 A | 1/1999 | Atkins | 705/36 |
| 5,875,437 A | 2/1999 | Atkins | 705/40 |
| 5,884,283 A | 3/1999 | Manos | 705/30 |
| 5,884,285 A | 3/1999 | Atkins | 705/36 |
| 5,884,287 A | 3/1999 | Edesess | 705/36 |
| 5,907,801 A | 5/1999 | Albert | |
| 5,911,135 A | 6/1999 | Atkins | 705/36 |
| 5,911,136 A | 6/1999 | Atkins | 705/36 |
| 5,913,202 A | 6/1999 | Motoyama | 705/35 |
| 5,918,217 A | 6/1999 | Maggioncalda et al. | 705/36 |
| 5,918,218 A | 6/1999 | Harris | |
| 5,930,774 A | 7/1999 | Chennault | 705/36 |
| 5,930,775 A | 7/1999 | McCauley et al. | 705/38 |
| 5,933,815 A | 8/1999 | Golden | 705/35 |
| 5,978,778 A | 11/1999 | Oshaughnessy | |
| 5,987,433 A | 11/1999 | Crapo | 705/36 |
| 5,987,434 A | 11/1999 | Libman | 705/36 |
| 5,991,744 A | 11/1999 | DiCresce | 705/36 |
| 5,999,918 A | 12/1999 | Williams et al. | |
| 6,003,018 A * | 12/1999 | Michaud et al. | 705/36 |
| 6,012,042 A | 1/2000 | Black et al. | 705/36 |
| 6,012,043 A | 1/2000 | Albright et al. | 705/36 |
| 6,012,044 A | 1/2000 | Maggioncalda | |
| 6,018,722 A | 1/2000 | Ray et al. | 705/36 |
| 6,021,397 A | 2/2000 | Jones et al. | |
| 6,078,904 A * | 6/2000 | Rebane | 705/36 |
| 6,125,355 A | 9/2000 | Bekaert | |
| 6,275,814 B1 * | 8/2001 | Giansante et al. | 705/36 |
| 6,292,787 B1 | 9/2001 | Scott | |
| 6,496,741 B1 * | 12/2002 | Whiffen | 700/28 |
| 6,601,044 B1 * | 7/2003 | Wallman | 705/36 |

FOREIGN PATENT DOCUMENTS

| | | |
|---|---|---|
| GB | 2 306 713 | 7/1997 |
| JP | 04-193658 | 7/1992 |
| JP | 05-177511 | 6/1993 |
| JP | 05-081202 | 8/1993 |
| WO | WO 91/02326 | 2/1991 |
| WO | WO 96/06402 | 2/1996 |
| WO | WO 98/13776 | 4/1998 |
| WO | WO 98/44444 | 10/1998 |
| WO | WO 98/54666 | 12/1998 |
| WO | WO 99/05625 | 2/1999 |
| WO | WO 99/15985 | 4/1999 |
| WO | WO 99/22323 | 5/1999 |
| WO | WO 01/05793 | 7/2001 |

OTHER PUBLICATIONS

International Search Report; PCT/US 98/19920.
International Search Report; PCT/US 98/19951.
International Search Report; PCT/ US 98/19952.
International Search Report; PCT/US 98/20709.
Nikolopoulos and Fellrath, "A Hybrid Expert System for Investment Advising", IEEE, 1994, pp. 1818-1820.
Eggenschwiler and Gamma, "ET++SwapsManager: Using Object Technology in the Financial Engineering Domain", OOPSLA, 1992, pp. 166-177.
Jensen and King, "Frontier: A graphical interface for portfolio optimization in a piecewise linear-quadratic risk framework", IBM Systems Journal, vol. 31, No. 1, 1992, pp. 62-70.
Schmerken, "Making Risk Analysis Easy As Alpha, Beta", Wall Street Computer Review, 1988, vol. 5 #4, pp. 8,10,12.
Malliaris and Salchenberger, "Beating the Best: A Neural Network Challenges the Black-Scholes Formula", IEEE, 1993, pp. 445-449.
"Asset Allocation—One Step at a Time," Global Investor, Mar. 1997, 8 pages.
"1990 Buyer's Guide", Wall Street Computer Review, 1990, 23 pages.
Pantazopoulos et al, "A Knowledge Based System for Evaluation of Option Pricing Algorithms", Computer Science Dept., Purdue University, 1998, pp. 123-140.
Tanaka et al., "Possibility Portfolio Selection", IEEE, 1995, pp. 813-818.
Bellity, "Optimisation Floue Appliquee Au Choix De Portefeuilles", CCF Recherche & Innovation, 1994, 8 pages.
King, "Asymmetric risk measures and tracking models for portfolio optimization under uncertainty", J.C. Baltzer AG, 1993, pp. 165-177.
"InterFace Insitutional Software + Data", Ibbotson Associates, Wall Street Computer Review, 1998, 4 pages.
Edessess, Michael et al. "Scenario forecasting: Necessity, not choice." Journal of Portfolio Management, vol. 6 No. 3, pp. 10-15, Sprg 1980.
Eggenschwiler and Gamma, "ET++SwapsManager: Using Object Technology in the Financial Engineering Domain", OOPSLA, 1992, pp. 166-177.
Sharpe, W. F., "Asset Allocation: Management Style and Performance Measurement", The Journal of Portfolio Management, Winter, 1992, vol. 18, No. 2, pp. 1-14.
"Keeping Up With Technology: The 1991 Software Update" Trusts & Estates, pp. 34-67, Jun. 1991.
Hickox, Fayette, "Information Technology, Learning about Artificial Intelligence", Institutional Investor, pp. 209-210, Jul. 1986.
Wiener, Daniel P., "Software Packages for Investors," Fortune/1987 Investors Guide, pp. 185-188.
Lichtman, Paul, "Software: The Professional Plan," Lotus, Nov. 1986, pp. 121 and 140.
Paroush, Jacob. "Risk and wealth effects on efficient portfolio." Metroeconomics, vol. 26, No. 1-3, pp. 86-96, 1974.
Science & Technology, "A Financial Planner with Nerves of Silicon," Business Week, Oct. 7, 1985, 3 pages.
"The Benefits of the New Compatibility," Personal Computing, May 1986, 3 pages.
Woodwell, Donald R., "Automating Your Financial Portfolio", Second Edition, Dow Jones-Irwin, 1986.

The Funds Management Group, Inc., "Funds Allocation System", Software Update, pp. 1-9, No Date.

FPS/Optimum, "The Extended Analysis Language for All Users", pp. 1-2, 1986.

Fersko-Weiss, Henry, "Dialing for Profits, Managing the Market", Product Review, No Date.

Sharpe, W. F., et al., "Investments", Fifth Edition, Chapter 8, pp. 193-231, Chapter 11, pp. 293-321, Chapter 23, pp. 827-863, 1995.

"Barra Provides Combined Style Analysis and Asset Allocation Capabilities", downloaded from Website http://www.barra.com, in Jul. of 1998.

"EnCorr Products and Services", downloaded from Website http://www.ibbotson.com, in Jul. of 1998.

"Net Results," Investment Strategies Network, Inc., 1995, 1996, 1997, 97 pages.

IFPS/Optimum, "The Extended Analysis Language for All Users," Execucom Systems Corporation, 1986, 4 pages.

"Net Results TM, Your on-Line Financial Advisor", downloaded from Website http://www.isnetwork.com, in Dec. of 1997.

Voros, J. "Portfolio analysis—An analytic derivation of the efficient portfolio frontier." European Journal of Operations Research, vol. 23, No. 3, pp. 294-300, Mar. 1986.

ANONYMOUS., "Interactive Software Eases 401(k) Planning." Bank Marketing. V26. No. 10. 1994; p. 56.

Author Unknown., "Interactive Variable Control During Visualization of Mathematical Functions." IBM Technical Disclosure Bulletin. vol. 34. No. 9. 1992; pp. 288-289.

Author Unknown., "Microsoft Excel 97 Intermediate." © Cheltenham Computer Training 1995-2001. www.cctoglobal.com. pp. 26-30.

Bowers, N.L., "Actuarial Mathematics." The Society of Actuaries. 1986; pp. 52-59.

Carhart, M., "On Persistence in Mutual Fund Performance." The Journal of Finance. vol. 52. No. 1. 1997; pp. 57-82.

Kariya, T., "Elements of Financial Science." Toyo Keizai Shimpo, K.K., Sep. 25, 1997, pp. 71-101 (Capter 5) and pp. 117-133 (Chapter 7).

Murray, G.W. et al. "Practical Optimization." Academic Press. Chapter 5. 1981.

Sharpe, W.F., "AAT Asset Allocation Tools." The Scientific Press, 1985. pp. 84-85; pp. 93-96.

Society of Actuaries., "1994 Group Annuity Mortality Table and 1994 Group Annuity Reserving Table." vol. 47. 1994; pp. 865-913.

* cited by examiner

US 7,249,081 B2

LOAD AWARE OPTIMIZATION

This application claims the benefit of U.S. Provisional Application No. 60/184,408, filed Feb. 23, 2000, which is incorporated herein by reference.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The invention relates generally to the field of financial advisory services. More particularly, the invention relates to a process in which an optimized portfolio of financial products may be generated from a universe in which one or more financial products carry a front or back end load.

BACKGROUND OF THE INVENTION

From a set of N financial products (N>1), an infinite number of portfolios are available for investment. For purposes of this application, the term "financial product" is broadly defined as a legal representation of the right (often denoted as a claim or security) to provide or receive prospective future benefits under certain stated conditions. For example, domestic or foreign common stock, domestic or foreign bonds, real estate, cash equivalents, mutual funds, exchange traded funds (ETFs) and other securities or portfolios of securities and the like are contemplated by the term "financial product."

At any rate, existing computer financial analysis systems (also referred to as "portfolio optimizers") purport to help individuals select portfolios to meet their needs. These systems typically implement mathematical models based upon standard optimization techniques involving mean-variance optimization theory. According to the mean-variance approach to portfolio selection, an optimal portfolio of financial products may be identified with reference to an investor's preference for various combinations of risk and return and the set of efficient portfolios (also referred to as the efficient set or the efficient frontier). FIG. 1 illustrates a feasible set of portfolios that represents all the portfolios that may be formed from a particular set of financial products. The arc AC represents an efficient set of portfolios that each provides the highest expected return for a given level of risk. A portfolio's risk is typically measured by the standard deviation of returns.

In general, the process of portfolio optimization involves determining a portfolio of financial products that maximize the utility function of an investor. Typically portfolio optimization processing assumes that users have a utility function reasonably approximated by a quadratic utility function (i.e. mean-variance utility), namely, that people like having more wealth on average and dislike volatility of wealth. Based on this assumption and given a user's risk tolerance, an optimized portfolio that is mean-variance efficient is calculated from the set of financial products available to the user.

The problem of determining an optimized portfolio from a set of N financial products may be expressed as a series of one or more Quadratic programming (QP) problems. QP is a technique for optimizing (minimizing or maximizing) a quadratic function of decision variables subject to linear equality and or inequality constraints on those decision variables. One particular type of QP technique, referred to as the "active set" method, has been utilized in financial analysis products by Financial Engines, Inc. (FEI). The "active set" method is described in Gill, Murray, and Wright, "*Practical Optimization*", Academic Press, 1981, Chapter 5 which is hereby incorporated by reference. Another frequently used method is the critical-line algorithm, which is described in Markowitz, *Portfolio Selection, $2^{nd}$ edition*, Blackwell, Cambridge, Mass. 1991, which is hereby incorporated by reference. Additionally, if the optimization problem is appropriately constrained, then it may be solved using the gradient method of QP as described in Sharpe, "An Algorithm for Portfolio Improvement," *Advances in Mathematical programming and Financial Planning*, JAI Press, Inc., 1987, which is hereby incorporated by reference.

Current QP optimization programs do not have the capability of factoring the payment of a load either at the front end or back end of the purchase of a financial product since the inclusion of a load significantly changes the form of the function being optimized, i.e. the objective function is no longer quadratic. In short, using prior art optimization QP techniques, it is not possible to easily and efficiently determine an optimum portfolio for an investor by reallocating his current portfolio when his portfolio already includes a portion of loaded financial products.

SUMMARY OF THE INVENTION

A process utilizing a modification to the inputs to a standard portfolio optimization is described for facilitating load aware optimizations. First, each loaded financial product of a set of available financial products is modeled as a loaded portion and an unloaded portion by determining an adjusted return for each of the load-bearing financial products based on a predetermined holding period, the current holdings in the load-bearing financial product, information regarding expected future contributions to or withdrawals from the load bearing financial product, the expected return of the load-bearing financial product, and the amount of load associated with the load-bearing financial product. Then a recommended portfolio of one or more financial products from the set of available financial products is generated based upon the adjusted return of each load-bearing financial product and the expected return of each financial product that is not load-bearing.

Other features of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
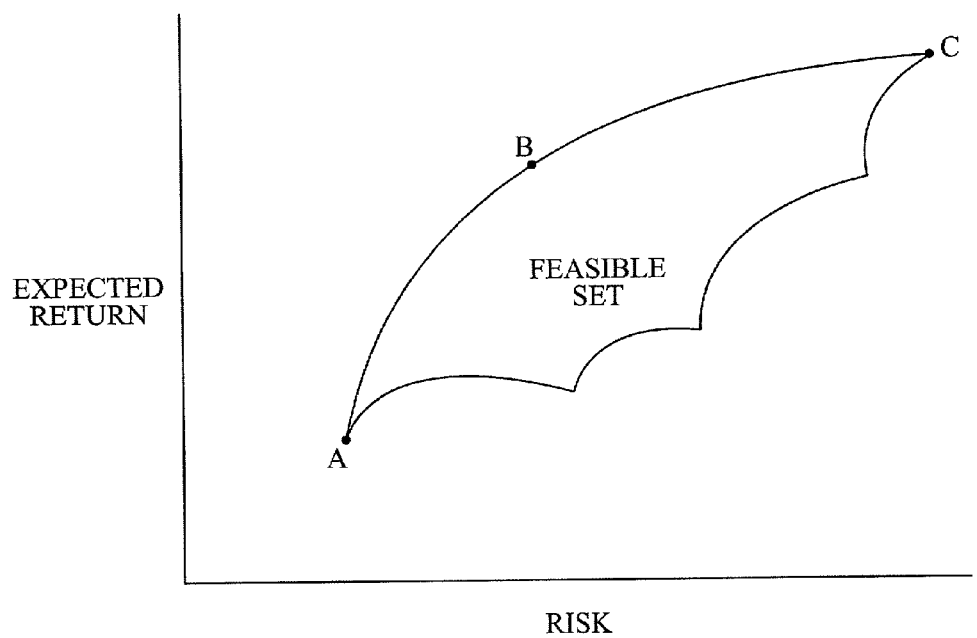
FIG. 1 illustrates a feasible set of portfolios that can be formed from a set of financial products.

The load aware portfolio optimization techniques described herein involve a method of optimizing a portfolio in which one or more financial products in the universe of financial products, from which the portfolio will be chosen, includes one or more load bearing financial products. According to one embodiment of the present invention, a mechanism is provided for solving the load aware optimization problem while retaining the capability to utilize QP techniques.

Embodiments of the invention incorporate significant changes to the prior art optimization methods. In certain embodiments, the return of the loaded financial product is described in terms of a no-load financial product for solving the optimization problem by adjusting the actual predicted return of the loaded financial product to account for the effect of the load over the term of the optimization. For example, if the period of the optimization is 1 year and the financial product has a 5% load, the effective return of the financial product would be reduced by 5% from the predicted annual return. Similarly, if the period of the optimization is 5 years and the financial product has a 5% load, than the effective annual return would be reduced only 1% from the predicted annual return.

Investors using embodiments of the invention often own portfolios that contain previously purchased financial products. Determining an optimized portfolio for such an investor often involves advising the investor to reallocate the relative amount of financial products held in his pre-optimized portfolio. The investor may be advised to sell certain financial products in whole or in part, or the investor may be advised to increase the amount of certain financial products the investor holds. The adjustments to returns for loads are different depending on whether the investor is advised to sell the loaded financial products or purchase more of the loaded financial products in order to reach his optimal portfolio allocation. Buying more of a previously held financial product is analyzed at a rate of return adjusted for load fees paid on the purchase as well as fees charged to future contributions to the product. When a portion of the holding is sold, the remaining portion of the financial product is analyzed at a rate of return adjusted for fees charged to future contributions to the product.

To regain the advantages of being able to solve the optimization problem using QP techniques, embodiments of the invention double the number of variables associated with previously held loaded financial products. One set of variables describes a portion of the loaded financial products to be sold in order to reach the optimized portfolio of financial products, and the other set of variables describes a portion of the loaded financial products to be purchased in order to reach the optimal portfolio. After the QP optimization has been run, the two sets of variables are added together to generate the relative portions of various loaded financial products in the optimized (recommended) portfolio.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be embodied in machine-executable instructions. The instructions can be used to cause a general-purpose or special-purpose processor, which is programmed with the instructions to perform the steps of the present invention. Alternatively, the steps of the present invention may be performed by specific hardware components that contain hardwired logic for performing the steps, or by any combination of programmed computer components and custom hardware components.

The present invention may be provided as a computer program product that may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

While embodiments of the present invention will be described with reference to a financial advisory system, the method and apparatus described herein are equally applicable to other types of asset allocation applications, financial planning applications, investment advisory services, financial product selection services, automated financial product screening tools such as electronic personal shopping agents and the like. Furthermore, the portfolio optimization problem is discussed in terms of financial product herein, although any type of financial product may be specified such as stock and bonds.

System Overview

Figure 2:
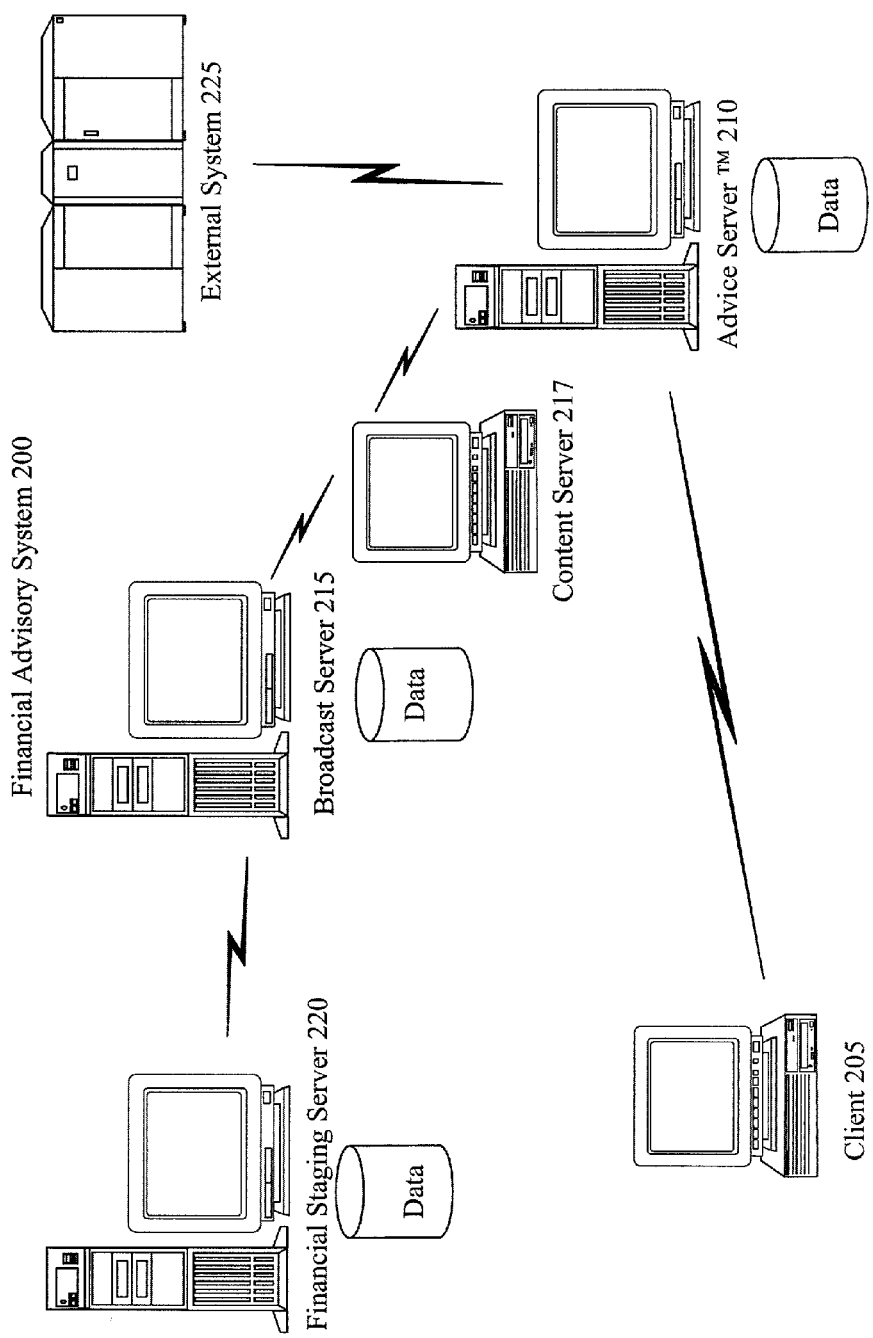
FIG. 2 illustrates a financial advisory system according to one embodiment of the present invention.

The present invention may be included within a client-server based financial advisory system 200 such as that illustrated in FIG. 2. According to the embodiment depicted in FIG. 2, the financial advisory system 200 includes a financial staging server 220, a broadcast server 215, a content server 217, an AdviceServer™ 210 (AdviceServer is a trademark of Financial Engines, Inc., the assignee of the present invention), and a client 205.

The financial staging server 220 may serve as a primary staging and validation area for the publication of financial content. In this manner, the financial staging server 220 acts as a data warehouse. Raw source data, typically time series data, may be refined and processed into analytically useful data on the financial staging server 220. On a monthly basis, or whatever the batch processing interval may be, the financial staging server 220 converts raw time series data obtained from data vendors from the specific vendor's format into a standard format that can be used throughout the financial advisory system 200. Various financial engines may also be run to generate data for validation and quality assurance of the data received from the vendors. Any calibrations of the analytic data needed by the financial engines may be performed prior to publishing the final analytic data to the broadcast server 215.

The broadcast server 215 is a database server. As such, it runs an instance of a Relational Database Management System (RDBMS), such as Microsoft™ SQL-Server, Oracle™ or the like. The broadcast server 215 provides a single point of access to all financial product information and analytic data. When advice servers, such as AdviceServer 210, need data, they may query information from the broadcast server database. The broadcast server 215 may also populate content servers, such as content server 217, so remote implementations of the AdviceServer 210 need not communicate directly with the broadcast server 215. The AdviceServer 210 is the primary provider of services for the client 205. The AdviceServer 210 also acts as a proxy between external systems, such as external system 225, and the broadcast server 215 or the content server 217.

According to the embodiment depicted, the user may interact with and receive feedback from the financial advisory system 200 using client software that may be running within a browser application or as a stand-alone desktop application on the user's personal computer 205. The client software communicates with the AdviceServer 210, which acts as a HTTP server.

An Exemplary Computer System

Figure 3:
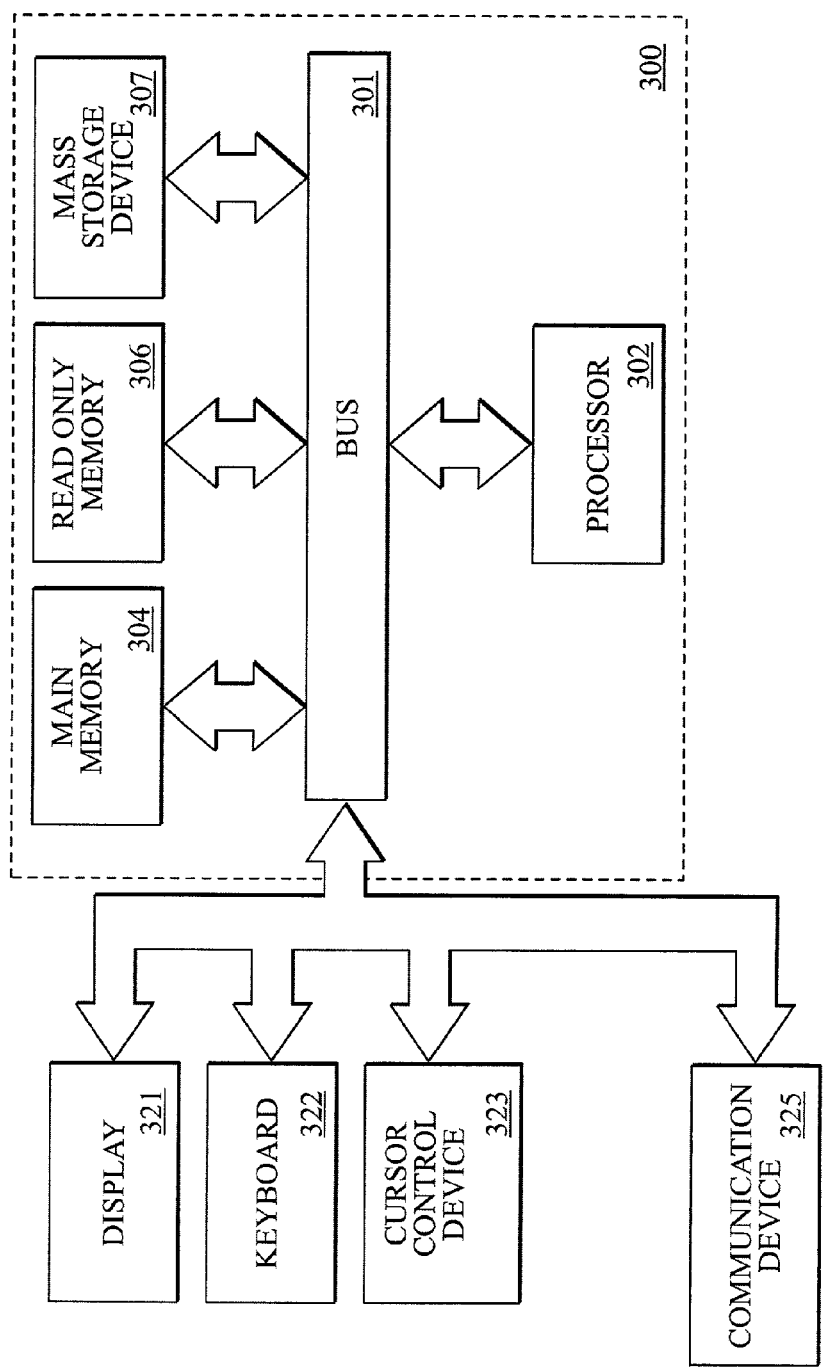
FIG. 3 is an example of a computer system upon which one embodiment of the present invention may be implemented.

Having briefly described an exemplary financial advisory system 200, which may employ various features of the present invention, a computer system 300 representing an exemplary client 105, or server in which features of the present invention may be implemented, will now be described with reference to FIG. 3. Computer system 300 comprises a bus or other communication means 301 for communicating information, and a processing means such as processor 302, coupled with bus 301 for processing information. Computer system 300 further comprises a random access memory (RAM) or another dynamic storage device 304 (referred to as main memory), coupled to bus 301 for storing information and instructions to be executed by processor 302. Main memory 304 also may be used for storing temporary variables or other intermediate information during execution of instructions by processor 302. Computer system 300 also comprises a read only memory (ROM) and/or other static storage device 306 coupled to bus 301 for storing static information and instructions for processor 302.

A data storage device 307, such as a magnetic disk or optical disc and its corresponding drive, may also be coupled to computer system 300 for storing information and instructions. Computer system 300 can also be coupled via bus 301 to a display device 321, such as a cathode ray tube (CRT) or Liquid Crystal Display (LCD), for displaying information to a computer user. For example, graphical depictions of expected portfolio performance, asset allocation for an optimal portfolio, charts indicating short- and long-term financial risk, icons indicative of the probability of achieving various financial goals, and other data types may be presented to the user on the display device 321. Typically, an alphanumeric input device 322, including alphanumeric and other keys, is coupled to bus 301 for communicating information and/or command selections to processor 302. Another type of user input device is cursor control 323, such as a mouse, a trackball, or cursor direction keys for communicating direction information and command selections to processor 302 and for controlling cursor movement on display 321.

A communication device 325 is also coupled to bus 301 for accessing remote servers, such as the AdviceServer 210, or other servers via the Internet, for example. The communication device 325 may include a modem, a network interface card, or other well-known interface devices, such as those used for coupling to Ethernet, token ring, or other types of networks. In any event, in this manner, the computer system 300 may be coupled to a number of servers via a conventional network infrastructure, such as a company's Intranet and/or the Internet, for example.

Exemplary Analytic Modules

Figure 4:
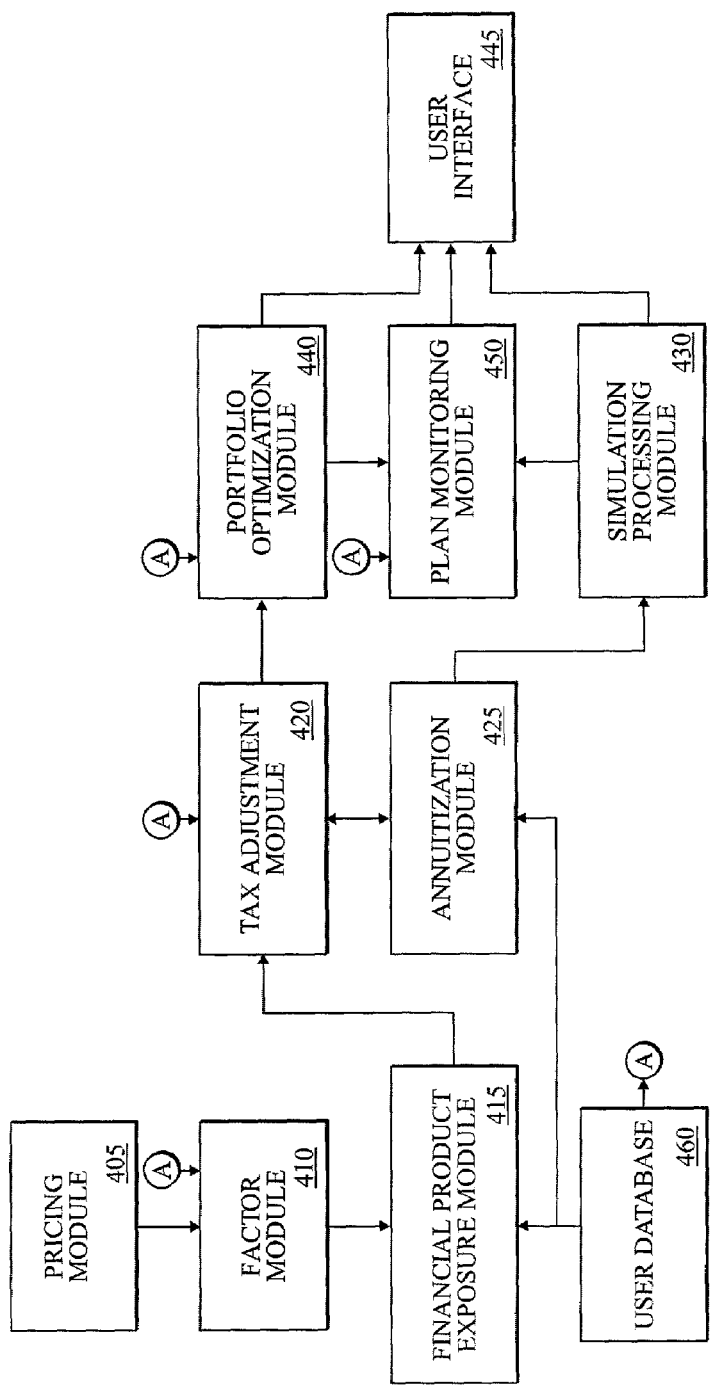
FIG. 4 is a simplified block diagram illustrating exemplary analytic modules of a financial advisory system according to one embodiment of the present invention.

FIG. 4 is a simplified block diagram illustrating exemplary analytic modules of the financial advisory system 200 according to one embodiment of the present invention. According to the embodiment depicted, the following modules are provided: a pricing module 405, a factor module 410, a financial product mapping module 415, a tax adjustment module 420, an annuitization module 425, a simulation processing module 430, a portfolio optimization module 440, a user interface (UI) module 445, and a plan monitoring module 450. It should be appreciated that the functionality described herein may be implemented in more or in fewer modules than discussed below. Additionally, the modules and functionality may be distributed in various configurations among a client system, such as client 205, and one or more server systems, such as the financial staging server 220, the broadcast server 215, or the AdviceServer 210. The functionality of each of the exemplary modules will now be briefly described.

An "econometric model" is a statistical model that provides a means of forecasting the levels of certain variables referred to as "endogenous variables," conditional on the levels of certain other variables, known as "exogenous variables," and in some cases previously determined values of the endogenous variables (sometimes referred to as lagged dependent variables). The pricing module 405 is an equilibrium econometric model for forecasting prices and returns (also referred to herein as "core asset scenarios") for a set of core asset classes. The pricing module provides estimates of current levels and forecasts of economic factors (also known as state variables), upon which, the estimates of core asset class returns are based. According to one embodiment of the present invention, the economic factors may be represented with three exogenous state variables: price inflation, a real short-term interest rate, and dividend growth. The three exogenous state variables may be fitted with autoregressive time series models to match historical moments of the corresponding observed economic variables as described further below.

In any event, the resulting core asset classes are the foundation for portfolio simulation and are designed to provide a coherent and internally consistent (e.g., no arbitrage) set of returns. What is meant by arbitrage is an opportunity to create a profitable trading opportunity that involves no net investment and positive values in all states of the world.

According to one embodiment, the core asset classes include short-term US government bonds, long-term US government bonds, and US equities. To expand the core asset classes to cover the full range of possible investments that people generally have access to, additional asset classes may be incorporated into the pricing module 405 or the additional asset classes may be included in the factor model 410 and be conditioned on the core asset classes as discussed further below.

Based upon the core asset scenarios generated by the pricing module 405, the factor module 410 produces return scenarios (also referred to herein as "factor model asset scenarios") for a set of factor asset classes that are used for both exposure analysis, such as style analysis, and the simulation of portfolio returns. The additional asset classes, referred to as factors, represented in the factor model are conditional upon the core asset class return scenarios generated by the pricing module 405. According to one embodiment, these additional factors may correspond to a set of asset classes or indices that are chosen in a manner to span the range of investments typically available to individual investors in mainstream mutual financial products and defined contribution plans. For example, the factors may be divided into the following groups: cash, bonds, equities, and foreign equities. The equities group may further be broken down into two different broad classifications: (1) value versus growth and (2) market capitalization. Growth stocks are basically stocks with relatively high prices relative to their underlying book value (e.g., high price-to-book ratio). In contrast, value stocks have relatively low prices relative to their underlying book value. With regard to market capitalization, stocks may be divided into groups of large, medium, and small capitalization. An exemplary set of factors is listed below in Table 1.

TABLE 1

Exemplary Set of Factors

| Group | Factor |
| --- | --- |
| Cash: | Short Term US Bonds (core class) |
| Bonds: | Intermediate-term US Bonds (core class) |
|  | Long-term US Bonds (core class) |
|  | US Corporate Bonds |
|  | US Mortgage Backed Securities |
|  | Non-US Government Bonds |
| Equities: | Large Cap Stock-Value |
|  | Large Cap Stock-Growth |
|  | Mid Cap Stock-Value |
|  | Mid Cap Stock-Growth |
|  | Small Cap Stock-Value |
|  | Small Cap Stock-Growth |
| Foreign: | International Equity-Europe |
|  | International Equity-Pacific |
|  | International Equity-Emerging Markets |

At this point it is important to point out that completely different factors may be employed depending upon the specific implementation. The factors listed in Table 1 are simply presented as an example of a set of factors that achieve the goal of spanning the range of investments typically available to individual investors in mainstream mutual financial products and defined contribution plans. It will be apparent to those of ordinary skill in the art that alternative factors may be employed. In particular, it is possible to construct factors that represent functions of the underlying asset classes for pricing of securities that are nonlinearly related to the prices of certain asset classes (e.g., derivative securities). In other embodiments of the present invention, additional factors may be relevant to span a broader range of financial alternatives, such as industry specific equity indices.

On a periodic basis, the financial product-mapping module 415 maps financial product returns onto the factor model. Importantly, the financial product returns need not represent fixed allocations of a single financial product. Within the context of the optimization problem, any individual asset return may be composed of a static or dynamic strategy involving one or more financial products. For example, one of the assets may itself represent a constant re-balanced strategy over a group of financial products. Moreover, any dynamic strategy that can be formulated as an algorithm may be incorporated into the portfolio optimization. For example, an algorithm which specifies risk tolerance which decreases with the age of the user could be implemented. It is also possible to incorporate path dependent algorithms (e.g., portfolio insurance). In one embodiment, the process of mapping financial product returns onto the factor model comprises decomposing financial product returns into exposures to the factors. The mapping, in effect, indicates how the financial product returns behave relative to the returns of the factors. According to one embodiment, the financial product-mapping module 415 is located on one of the servers (e.g., the financial staging server 220, the broadcast server 215, or the AdviceServer 210). In alternative embodiments, the financial product-mapping module 415 may be located on the client 205.

In one embodiment of the present invention, an external approach referred to as "returns-based style analysis" is employed to determine a financial product's exposure to the factors. The approach is referred to as external because it does not rely upon information that may be available only from sources internal to the financial product. Rather, in this embodiment, typical exposures of the financial product to the factors may be established based simply upon realized returns of a financial product, as described further below. For more background regarding returns-based style analysis see Sharpe, William F. "Determining a Fund's Effective Asset Mix," Investment Management Review, December 1988, pp. 59-69 and Sharpe, William F. "Asset Allocation: Management Style and Performance Measurement," The Journal of Portfolio Management, 18, no. 2 (Winter 1992), pp. 7-19 ("Sharpe [1992]").

Alternative approaches to determining a financial product's exposure to the factors include surveying the underlying assets held in a financial product (e.g. a mutual fund) via information filed with regulatory bodies, categorizing exposures based on standard industry classification schemes (e.g. SIC codes), identifying the factors exposures based on analysis of the structure of the product (e.g. equity index options, or mortgage backed securities), and obtaining exposure information based on the target benchmark from the asset manager of the financial product. In each method, the primary function of the process is to determine the set of factor exposures that best describes the performance of the financial product.

The tax adjustment module 420 takes into account tax implications of the financial products and financial circumstances of the user. For example, the tax adjustment module 420 may provide methods to adjust taxable income and savings, as well as estimates for future tax liabilities associated with early distributions from pension and defined contribution plans, and deferred taxes from investments in qualified plans. Further, the returns for financial products held in taxable investment vehicles (e.g. a standard brokerage account) may be adjusted to take into account expected tax effects for both accumulations and distributions. For example, the component of returns attributable to dividend income should be taxed at the user's income tax rate and the component of returns attributable to capital gains should be taxed at an appropriate capital gains tax rate depending upon the holding period.

Additionally, the tax module 420 may forecast future components of the financial products total return due to dividend income versus capital gains based upon one or more characteristics of the financial products including, for example, the active or passive nature of the financial product's management, turnover ratio, and category of financial product. This allows precise calculations incorporating the specific tax effects based on the financial product and financial circumstances of the investor. Finally, the tax module 420 facilitates tax efficient investing by determining optimal asset allocation among taxable accounts (e.g., brokerage accounts) and nontaxable accounts (e.g., an Individual Retirement Account (IRA), or employer sponsored 401(k) plan. In this manner the tax module 420 is designed to estimate the tax impact for a particular user with reference to that particular user's income tax rates, capital gains rates, and available financial products. Ultimately, the tax module 420 produces tax-adjusted returns and tax-adjusted distributions for each available financial product.

The portfolio optimization module 440 calculates the utility maximizing set of financial products under a set of constraints defined by the user and the available feasible investment set. In one embodiment, the calculation is based upon a mean-variance optimization of the financial products. The constraints defined by the user may include bounds on asset class and/or specific financial product holdings. In addition, users can specify intermediate goals, such as buying a house or putting a child through college, that are incorporated into the optimization. In any event, the optimization explicitly takes into account the impact of future contributions and expected withdrawals on the optimal asset allocation. Additionally, the factor covariance matrix used during optimization is calculated based upon the forecasts of expected returns for the factors generated by the factor module 410 over the investment time horizon. As a result, the portfolio optimization module 440 may explicitly take into account the impact of different investment horizons, including the horizon impact from intermediate contributions and withdrawals.

The simulation processing module 430 provides additional analytics for the processing of raw simulated return scenarios into statistics that may be displayed to the user via the UI 445. In one embodiment of the present invention, these analytics generate statistics such as the probability of attaining a certain goal or the estimated time required to reach a certain level of assets with a certain probability. The simulation processing module 430 also incorporates methods to adjust the simulated scenarios for the effects induced by sampling error in relatively small samples. The simulation processing module 430 provides the user with the ability to interact with the portfolio scenarios generated by the portfolio optimization module 440 in real-time.

The annuitization module 425 provides a meaningful way of representing the user's portfolio value at the end of the term of the investment horizon. Rather than simply indicating to the user the total projected portfolio value, one standard way of conveying the information to the user is converting the projected portfolio value into a retirement income number. The projected portfolio value at retirement may be distributed over the length of retirement by dividing the projected portfolio value by the length of retirement. More sophisticated techniques may involve determining how much the projected portfolio value will grow during retirement and additionally consider the effects of inflation. In either event, however, these approaches erroneously assume the length of the retirement period is known in advance.

It is desirable, therefore, to present the user with a retirement income number that is more representative of an actual standard of living that could be locked in for the duration of the user's retirement. According to one embodiment, this retirement income number represents the inflation adjusted income that would be guaranteed by a real annuity purchased from an insurance company or synthetically created via a trading strategy involving inflation-indexed treasury bond securities. In this manner, the mortality risk is taken out of the picture because regardless of the length of the retirement period, the user would be guaranteed a specific annual real income. To determine the retirement income number, standard methods of annuitization employed by insurance companies may be employed. Additionally, mortality probabilities for an individual of a given age, risk profile, and gender may be based on standard actuarial tables used in the insurance industry. For more information see Bowers, Newton L. Jr., et al, "Actuarial Mathematics," The Society of Actuaries, Itasca, Ill., 1986, pp. 52-59 and Society of Actuaries Group Annuity Valuation Table Task Force, "1994 Group Annuity Mortality Table and 1994 Group Annuity Reserving Table," Transactions of the Society of Actuaries, Volume XLVII, 1994, pp. 865-913. Calculating the value of an inflation-adjusted annuity value may involve estimating the appropriate values of real bonds of various maturities. The pricing module 405 generates the prices of real bonds used to calculate the implied real annuity value of the portfolio at the investment horizon.

Referring now to the plan monitoring module 450, a mechanism is provided for alerting the user of the occurrence of various predetermined conditions involving characteristics of the recommended portfolio. Because the data upon which the portfolio optimization module 440 depends is constantly changing, it is important to reevaluate characteristics of the recommended portfolio on a periodic basis so that the user may be notified in a timely manner when there is a need for him to take affirmative action, for example. According to one embodiment, the plan monitoring module 450 is located on the AdviceServer 410. In this manner, the plan monitoring module 450 has constant access to the user profile and portfolio data.

In one embodiment, the occurrence of two basic conditions may cause the plan monitoring module 450 to trigger a notification or alert to the user. The first condition that may trigger an alert to the user is the current probability of achieving a goal falling outside of a predetermined tolerance range of the desired probability of achieving that particular goal. Typically a goal is a financial goal, such as a certain retirement income or the accumulation of a certain amount of money to put a child though college. Additionally, the plan monitoring module 450 may alert the user even if the current probability of achieving the financial goal is within the predetermined tolerance range if a measure of the currently recommended portfolio's utility has fallen below a predetermined tolerance level. Various other conditions are contemplated that may cause alerts to be generated. For example, if the nature of the financial products in the currently recommended portfolio have changed such that the risk of the portfolio is outside the user's risk tolerance range, the user may receive an indication that he should rebalance the portfolio.

The UI module 445 provides mechanisms for data input and output to provide the user with a means of interacting with and receiving feedback from the financial advisory system 200, respectively. Further description of a UI that may be employed according to one embodiment of the present invention is disclosed in a U.S. Pat. No. 5,918,217 entitled "USER INTERFACE FOR FINANCIAL ADVISORY SYSTEM," the contents of which are hereby incorporated by reference.

Other modules may be included in the financial advisory system 200 such as a pension module and a social security module. The pension module may be provided to estimate pension benefits and income. The social security module may provide estimates of the expected social security income that an individual will receive upon retirement. The estimates may be based on calculations used by the Social Security Administration (SSA) and on probability distributions for reductions in the current level of benefits.

Portfolio Optimization

Portfolio optimization is the process of determining a set of financial products that maximizes the utility function of a user. According to one embodiment, portfolio optimization processing assumes that users have a utility function reasonably approximated by a quadratic utility function (i.e., mean-variance utility), namely, that people like having more wealth on average and dislike volatility of wealth. Based on this assumption and given a user's risk tolerance, the portfolio optimization module 440 calculates the mean-variance efficient portfolio from the set of financial products available to the user. As described above, constraints defined by the user may also be taken into consideration by the optimization process. For example, the user may indicate a desire to have a certain percentage of his portfolio allocated to a particular financial product. In this example, the optimization module 440 determines the allocation among the unconstrained financial products such that the recommended portfolio as a whole accommodates the user's constraint(s) and is optimal for the user's level of risk tolerance.

Prior art mean-variant portfolio optimization traditionally treats the problem as a single period optimization, and uses only the single period properties of the financial products to be optimized (expected returns and the covariance of returns) as parameters in the optimization. Importantly, in the embodiments described herein, the portfolio optimization problem for financial products with loads is structured in such a way that it may explicitly take into account the impact of different investment horizons and the impact of intermediate contributions and withdrawals. Further the problem is set up so that it may be solved with QP methods, however, the parameters of the optimization will have multiple-period properties, which can be quite distinct from their single period counterparts.

Figure 5:
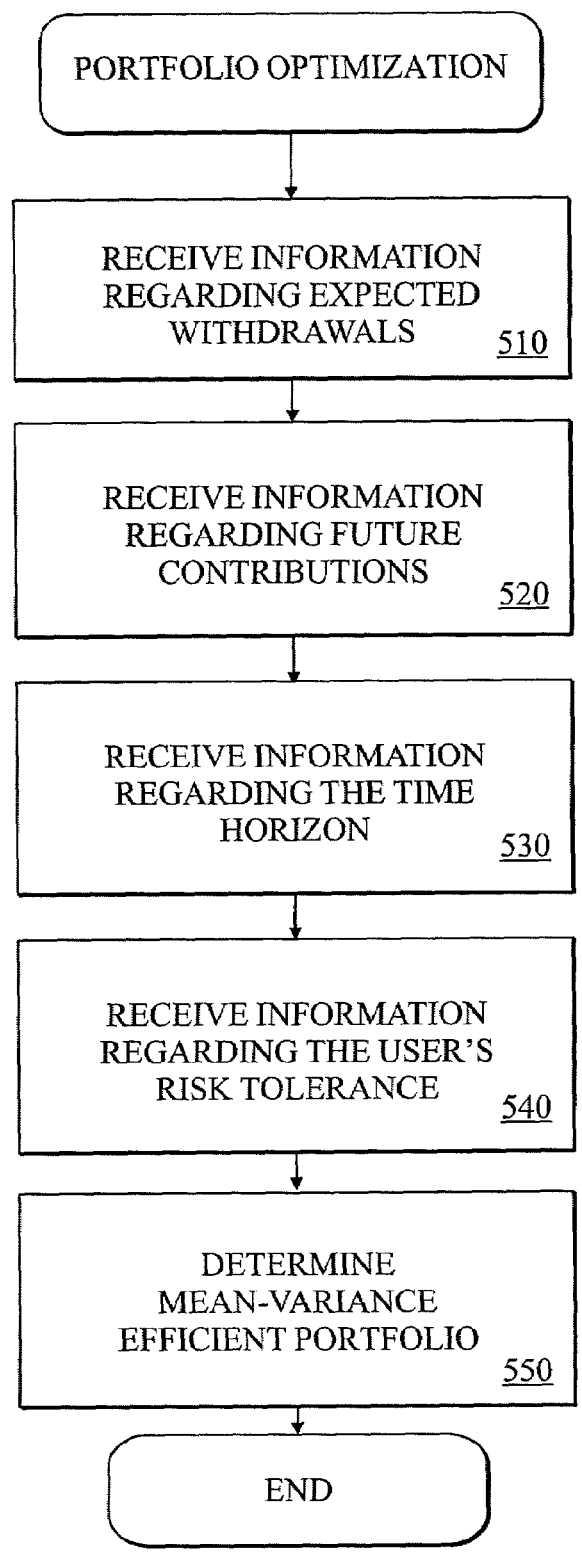
FIG. 5 is a flow diagram illustrating portfolio optimization according to one embodiment of the present invention.

Referring now to FIG. 5, a method of portfolio optimization according to one embodiment of the present invention will now be described. At step 505, information regarding the set of financial products to consider in the optimization is received. In particular, if the user holds any of these financial products in their current portfolio, the dollar amount of any holdings is received. At step 510, information regarding expected withdrawals is received. This information may include the dollar amount and timing of the expected withdrawal. At step 520, information regarding expected future contributions is received. According to one embodiment, this information may be in the form of a savings rate expressed as a percentage of the user's gross income or alternatively a constant or variable dollar value may be specified by the user.

At step 530, information regarding the relevant investment time horizon is received. In an implementation designed for retirement planning, for example, the time horizon might represent the user's desired retirement age.

At step 540, information regarding the user's risk tolerance, Tau, is received.

At step 550, the mean-variance efficient portfolio is determined while taking into consideration front end and/or back end loads associated with one or more financial products in the set of available financial products. According to one embodiment, the expected utility of wealth as measured in real dollars at time T is approximately maximized by determining the portfolio proportions that maximize a quadratic function. This problem may be solved with QP methods.

First, an initial portfolio is identified as a starting point for solving the optimization problem. Typically, the initial portfolio is specified by an investor and may consist of available financial products and/or financial products currently held by the investor. For example, if the investor were optimizing his 401(k) plan, the initial portfolio would be the financial products he currently holds in the plan. The initial set of financial products would be all the financial products that the investor may invest in as part of an optimized portfolio. For example, if the 401(k) investor has 20 financial products to choose from in his 401(k) plan, that set of 20 would represent all the financial products that could possibly be allocated in the investor's optimized 401(k) portfolio.

Each loaded financial product within the set of financial products is modeled as an equivalent hypothetical no-load financial product having predicted returns adjusted by the amount of the load as factored over the term of the optimization and taking into consideration future contributions and withdrawals to each loaded financial product. Typically, an adjusted return for the hypothetical equivalent no-load financial product is generated as follows. A predetermined holding period is divided into T time intervals, which are labeled by the integers from one to T. The intervals usually correspond to equal one-year periods, and T then represents the duration of the holding period as measured in years. If $R_t$ represents the simple return of the loaded financial product in the $t^{th}$ time interval, then the gross return in this interval is by definition equal to $(1+R_t)$. The adjusted simple return $\Gamma_t$, the simple return of its hypothetical no-load equivalent, is given by the expression:

$$\Gamma_t = [(1-\gamma) \cdot (1+R_t)] - 1 \qquad (EQ\ \#1)$$

The adjusted gross return is then equal to $(1+\Gamma_t)$. In equation (1), the variable $\gamma$ is called the adjustment, and given a fixed scenario of returns $\{R_1, R_2, \ldots R_T\}$ during the holding period, it is assumed to be the same over all time intervals in the holding period. However, the adjustment will typically vary from one scenario to the next. An equation to determine the adjustment is derived by equating the ending wealth of the loaded financial product to the ending wealth of the equivalent no-load financial product. This equation can be solved approximately (either numerically or analytically) for the adjustment. The adjustment will depend on the load fee, the initial invested wealth, the contributions and withdrawals, the holding period, and the scenario of random returns of the financial product during the holding period. Therefore the adjustment is a random variable with respect to the set of random scenarios of returns on the loaded financial product.

Using an approximate expression for the adjustment γ we can obtain statistical moments for $\Gamma_t$, the returns of the hypothetical equivalent no-load product. The expected value of the adjusted return is used for mean-variance portfolio optimization. The expected value of a random variable X will be denoted by E[X]. Here, the expectation is computed with respect to the random process that generates the stochastic returns of the loaded financial product. An expression for E[$\Gamma_t$] follows from equation (1):

$$E[\Gamma_t] = E[(1-\gamma) \cdot R_t] - E[\gamma] \qquad (EQ \#2)$$

An approximate value for E[$\Gamma_t$] can be computed numerically using Monte Carlo simulations.

The covariance of returns between two financial products is also used in mean-variance portfolio optimization. The covariance cov[X,Y] of two random variables X and Y is equal to the expected value of their product minus the product of their expected values. Consider the covariance of two financial products with loads. The products are labeled A and B, and have unadjusted returns represented by $R_{A,t}$ and $R_{B,t}$. The returns of the corresponding hypothetical no-load financial products are represented by $\Gamma_{A,t}$ and $\Gamma_{B,t}$, respectively, and are defined in terms of their adjustments $\gamma_A$ and $\gamma_B$ by equation (1). The covariance of the two adjusted returns in terms of the covariance of functions of the unadjusted returns is established with the following equation:

$$cov[\Gamma_{A,t}, \Gamma_{B,t}] = cov[(1-\gamma_A) \cdot (1+R_{A,t}), (1-\gamma_B) \cdot (1+R_{B,t})] \qquad (EQ \#3)$$

Here, the expectations underlying this covariance are with respect to both of the random processes that generate the stochastic returns of the loaded financial products. Approximate values for the covariance can be computed numerically using Monte Carlo techniques.

In the preferred embodiment, the size of an adjustment γ is small compared to one because it is of the same magnitude as the load fee parameter divided by the holding period, which is typically less than a few percent. In this case, any terms of the form (1-γ) are well approximated by just the value one. Using this approximation simplifies the equations for the statistical moments. In particular, equation (2) for the expected value of the adjusted return reduces to:

$$E[\Gamma_t] = E[R_t] - E[\gamma] \qquad (EQ \#4)$$

Similarly, equation (3) for the covariance of adjusted returns reduces to:

$$cov[\Gamma_{A,t}, \Gamma_{B,t}] = cov[(1+R_{A,t}), (1+R_{B,t})] = cov[R_{A,t}, R_{B,t}] \qquad (EQ \#5)$$

Hence, the covariance of adjusted returns is approximately equal to the covariance of unadjusted returns, and the latter can be used for the former. Further, it is apparent that the major impact of loads on mean-variance optimization is via the adjustment to the expected returns. These approximations are confirmed by tests using Monte Carlo techniques.

The process of computing adjustments and statistical moments of adjusted returns is illustrated by the following equations for the case of a financial product with a front-end load fee given by the parameter λ. Let $C_t$ be the contribution (withdrawals are negative contributions) at the beginning of the $t^{th}$ interval, let W be the initial wealth in the financial product, and ΔW be any change to the initial wealth at the start of the holding period. The ending wealth of the loaded financial product with load fee λ is equated to the ending wealth of the equivalent no-load financial product to obtain the following equation:

$$[W + \Delta W - \lambda \cdot \|\Delta W\|] \cdot G(1, T) + \qquad (EQ \#6)$$
$$\sum_{t=1}^{T} [C_t - \lambda \cdot \|C_t\|] \cdot G(t, T) - [W + \Delta W] \cdot (1-\gamma)^T \cdot G(1, T) +$$
$$\sum_{t=1}^{T} C_t \cdot (1-\gamma)^{1+T-t} \cdot G(t, T)$$

where $\|x\| = \max(x,0)$, and G(t,T), the gross return of the financial product with loads over all the intervals from t to T, is given by:

$$G(t, T) = \prod_{k=t}^{T} (1+R_k) = (1+R_t) \cdot (1+R_{t+1}) \ldots (1+R_T) \qquad (EQ \#7)$$

It is observed from the left hand side of equation (6) that load fees are paid on only a positive beginning increment of wealth and on contributions, but not on withdrawals.

Continuing the illustration, an approximate analytic expression for the adjustment as a linear function of the load fee is obtained by using equation (6) to evaluate the coefficients for a two-term McClaurin series expansion of γ as a function of λ. It is noted that when the load fee is set equal to zero in equation (6) that the value of the adjustment that satisfies equation (6) is zero. Using the technique of implicit differentiation on equation (6), an equation for the derivative of the adjustment γ with respect to the load fee λ is obtained. This equation yields the value of the derivative when the load fee is zero. Substituting these values into the formula for the two-term McClaurin series gives the following approximation for the adjustment:

$$\gamma = (\lambda/T) \cdot \left[ \frac{\|\Delta W\| \cdot G(1, T) + \sum_{t=1}^{T} [\|C_t\| \cdot G(t, T)]}{(W + \Delta W) \cdot G(1, T) + (1/T) \cdot \sum_{t=1}^{T} [(1+T-t) \cdot C_t \cdot G(t, T)]} \right] \qquad (EQ \#8)$$

This approximation neglects quadratic and all higher powers of the load fee. Since practical load fees are much less than 10%, the magnitude of terms neglected is much less than 1%.

The expected value of the adjusted return is of particular interest in portfolio optimization problems. For the illustrative example, the simplified expression given by equation (4) is valid, and the expected adjusted return is equal to the expected unadjusted return minus the expected value of the adjustment. A value for the expected adjustment can be computed numerically, however, in one embodiment the variance of the returns $R_t$ is sufficiently small so that the expected value of a well-behaved function of $R_t$ is well approximated by the function evaluated at e, the expected value of E[$R_t$]. In this case, equations (4) and (8) simplify to the following analytic formula:

$$E[\Gamma_t] = e - (\lambda/T) \cdot \left[ \frac{\|\Delta W\| + \sum_{t=0}^{T-1}[\|C_{t+1}\| \cdot (1+e)^{-t}]}{(W + \Delta W) + \sum_{t=0}^{T-1}[C_{t+1} \cdot (1-t/T) \cdot (1+e)^{-t}]} \right] \quad \text{(EQ \#9)}$$

Again, these approximations are confirmed by tests using Monte Carlo techniques. It is seen from equation (9) that the expected value of the returns of the equivalent no-load financial product depends on the expected value of the returns for the financial product with front-end loads, the holding period, the initial wealth, and the future and current contributions and withdrawals, as well as the load fee.

In the preferred embodiment, a number of financial products with (and without) load fees are combined in a portfolio at constant relative wealth proportions. These proportions, called the target mix, are approximately maintained through time by periodically selling and buying the products to achieve the wealth proportions of the target mix. Such a strategy is called a constant-mix strategy, and has the property that the portfolio's risk as measured by the variance of its returns is approximately constant through time. In the process of computing adjusted returns for constant-mix portfolios, the initial wealth, the increment of wealth, and contributions can be written as functions of the total portfolio wealth, contributions, an initial mix, and the target mix, as shown by the following equations:

$$W_t = x_{o,i} \cdot W_p$$

$$\Delta W_i = (x_i - x_{o,i}) \cdot W_p$$

$$C_{i,t} = x_i \cdot C_{p,t} \quad \text{(EQ \#10)}$$

Here, $W_p$ represents the beginning wealth of the total portfolio, $W_t$ is the beginning wealth of the $i^{th}$ financial product, and $x_{o,i}$ is the beginning fraction of portfolio wealth in the $i^{th}$ financial product. Similarly, $x_i$ is the target wealth fraction for the $i^{th}$ financial product. The sums of the beginning fractions and target fractions are both equal to one. The beginning wealth increment for the $i^{th}$ financial product is $\Delta W_i$. Since an initial contribution or withdrawal can be made at the beginning of the first period, the increment in wealth for the portfolio as a whole is taken to be zero, without loss of generality. Lastly, $C_{i,t}$ is the contribution (or withdrawal) to the $i^{th}$ financial product at the beginning of the $t^{th}$ period. As an approximation, this quantity is taken to be the product of the target fraction and the contribution to the portfolio at a whole, which is denoted by $C_{p,t}$. This approximation neglects any incremental contributions and withdrawals that occur because of transfers of wealth between products during a periodic rebalancing.

The use of the formulas in equations (10) is illustrated by computing the expected adjusted return for the $i^{th}$ financial product with front-end loads in a constant-mix portfolio. The return in the $t^{th}$ interval, the expected return, and the load fee parameter of the $i^{th}$ financial product are represented by $R_{i,t}$, $e_i = E[R_{i,t}]$, and $\lambda_i$, respectively. The adjusted return of the corresponding hypothetical no-load financial product is represented by $\Gamma_{1,t}$ and is given by equation (1) with adjustment $\gamma_i$. Using equations (10) in equation (9) and rearranging terms yields the following set of equations for the expected value of the adjusted return:

$$x_i \cdot E[\Gamma_{i,t}] = (e_i - \delta_i) \cdot x_i - p_i \|x_i - x_{o,i}\| \quad \text{(EQ \#11)}$$

where the parameters $\delta_i$ and $p_i$ are given by:

$$\delta_i = (\lambda_i/T) \cdot \left[ \frac{\sum_{t=0}^{T-1}[\|C_{p,t+1}\| \cdot (1+e_i)^{-t}]}{W_p + \sum_{t=0}^{T-1}[C_{p,t+1} \cdot (1-t/T) \cdot (1+e_i)^{-t}]} \right] \quad \text{(EQ \#12)}$$

$$p_i = (\lambda_i/T) \cdot \left[ \frac{W_p}{W_p + \sum_{t=0}^{T-1}[C_{p,t+1} \cdot (1-t/T) \cdot (1+e_i)^{-t}]} \right]$$

The parameters $\delta_i$ and $p_i$ are referred to as the reduction parameter and penalty parameter, respectively. These parameters are functions of the load fee, initial portfolio wealth, future and current portfolio contributions and withdrawals, expected unadjusted returns, and the holding period. The product of the reduction parameter $\delta_i$ and the target mix $x_t$ represents a cost in expected return due to the ongoing payment of loads through contributions. The product of the penalty parameter $p_1$ and any increment to the target mix above the initial mix $\|x_i - x_{o,i}\|$ represents a cost in expected return due to an initial rebalancing of wealth from the initial mix to the target mix.

The formula for the expected value of the adjusted return for financial products with back-end loads is also given by equation (11), albeit with different formulas for the reduction and penalty parameters. Since either front-end or back-end load fees extract cash from the holdings in a financial product, the adjusted return can never be greater than the unadjusted return of a financial product. Hence, it follows that the reduction parameter is always non-negative. This result is confirmed for front-end loads by the first of equations (12). Similarly, all things being equal, any additional purchase of a financial product with loads does not have an advantage over a current holding in the product. Hence it follows that the penalty parameter is always non-negative. This result is confirmed for front-end loads by the second of equations (12).

It is noted from equations (12) that when the load fee $\lambda_1$ is zero that both $\delta_1$ and $p_1$ are equal to zero, and that the adjusted expected return is equal to the unadjusted expected return $e_1$. Hence portfolios of financial products that contain both products with and without loads can be handled by the same formulas provided the load fee for no-load products is taken equal to zero. A similar observation holds for covariance terms.

It is well known that given the expected returns for each of a portfolio of no-load financial products and the covariance terms between members of this portfolio, a mean-variance optimization may be performed to approximately maximize a user's expected utility. This problem results in a quadratic programming problem, whose solution is tractable using any one of a number of known quadratic programming techniques. A typical constant-mix, portfolio optimization program has the following vector-matrix form:

maximize $$\Phi(x) = e^T x - (x^T C x)/\tau$$

such that $$i^T x = 1$$

$$1 \leq x \leq u \quad \text{(EQ \#13)}$$

In equations (13), the superscript T denotes a vector transpose. The parameter $\tau$ is a specified risk tolerance parameter, x is a vector of target mixes, e is a vector of expected returns, i is a vector of ones, 1 is a vector of lower bounds, and u is a vector of upper bounds on the target mixes. All vectors are N dimensional column vectors, where N is the number of financial products considered for the portfolio. The $i^{th}$ element of each vector corresponds to the $i^{th}$ financial product. The (N×N) covariance matrix C has the covariance of returns between the $i^{th}$ and $j^{th}$ financial products as the element in its $i^{th}$ row and $j^{th}$ column. In the first equation, the objective function $\Phi(x)$ is to be maximized by computing an optimal target mix x* from the set of all feasible target mix vectors x. The objective function is a quadratic function of the target mix and a linear combination of the portfolio's expected return ($e^T x$, linear in x) and the portfolio's variance of returns ($x^T C x$, quadratic in x). The second equation, a feasibility constraint, requires that the sum of the elements of the target mix to be equal to one. This equation is referred to as the budget constraint. The bounds allow an investor to specify minimum and maximum amounts of a financial product he desires to hold in his portfolio. The investor can also specify an explicit amount to hold by setting the upper and lower bounds to the same explicit value. A typical value for a lower bound is zero; this is a no short-sell constraint. The upper and lower bounds are assumed to be feasible with respect to each other, and with respect to the budget constraint.

One common generalization of the typical portfolio optimization is to allow the portfolio to have M accounts, and a budget constraint for each account. Equation (13) is modified for this generalization by replacing the second equation by M equations of the form:

$$i_j^T x = f_j, j \in \{1, \ldots, M\} \quad \text{(EQ \#14)}$$

In equation (14), the vector $i_j$ is an N dimensional column vector with ones for the elements that correspond to financial products in the $j^{th}$ account, and zeros elsewhere. The values of the account fractions $f_j$ are given and represent the amount of total portfolio wealth to be allocated to the $j^{th}$ account. The sum of the account fractions typically equals one. Note that when there is just a single account, equations (14) reduce to the previous single account formulation given in equations (13). The typical portfolio optimization problem with multiple accounts has the following properties. The objective function is a quadratic function of N decision variables (the elements of x). There are simple upper and lower bounds on the decision variables (the vectors l and u). There are exactly M equality (budget) constraints on the feasible set of decision variables.

The portfolio optimization problem for financial products with loads has an objective function that differs substantially from the objective function $\Phi(x)$ in equations (13). Formally, this modification is obtained by replacing the expected return vector e, and the covariance matrix C by their load adjusted statistical moments. In the preferred embodiment, which includes load adjustments for the expected values but not for the covariance matrix, the objective function for a constant-mix portfolio optimization is of the form:

maximize $$\Phi(x) = (e-\delta)^T x - p^T \|x - x_o\| - (xCx)/\tau \quad \text{(EQ \#15)}$$

In equation (15) the N dimensional column vectors $\delta$ and p are called the reduction and penalty vectors, respectively. Typically these vectors depend on load fees, the holding period, the initial portfolio wealth, and current and future portfolio contributions and withdrawals. Further, the elements of these vectors are non-negative. In one embodiment of block 615, the elements of these vectors are computed using the formulas for front-end loads given by equations (12). Note that because of the penalty term, the objective function is no longer a quadratic function of the target mix x, and also depends on $x_o$, the N dimensional column vector of initial mix values.

The portfolio optimization problem for financial products with loads has a non-quadratic objective function of the form given by equation (15), one or more budget constraints of the form given by equation (14), and upper and lower bounds on the target mix given by the last of equations (13). To recover a quadratic program, a change in the decision variables can be made. One change, familiar to practitioners of portfolio optimization, is to introduce "buy" and "sell" variables defined by the following equations:

$$b = \|x - x_o\|$$

$$s = \|x_o - x\| \quad \text{(EQ \#16)}$$

In equation (16), the "buy" variable b represents the portion of the target mix that is purchased in addition to any current holdings. Similarly, the "sell" variable s represents the portion of the target mix that is sold from any current holdings. The following three properties of the vectors b and s are consequences of equations (16) and the maximum and minimum bounds on the vector x:

$$0 \leq b \leq \|u - x_o\|$$

$$0 \leq s \leq \|x_o - 1\|$$

$$b^T s = 0 \quad \text{(EQ \#17)}$$

The first two properties are simple bounds on the feasible values of b and s. Note that the lower bounds restrict the elements of b and s to non-negative values. The third property is a complementarity condition. Together with the non-negativity constraints, the complementarity condition requires that at least one of the $i^{th}$ elements of b and s be zero. The financial implication of this constraint is to prevent a simultaneous sale and purchase of the same position in a portfolio. A last property of equations (16) is a formula for the original vector x of decision variables in terms of $x_o$, b, and s:

$$x = x_o + b - s \quad \text{(EQ \#18)}$$

Using equation (18) and a feasible pair of buy-sell vectors, a feasible value of the target mix vector can be constructed. In particular, if b* and s* are the optimal feasible vectors for a program in b and s, then the optimal portfolio mix x* can be computed.

There are two ways to recover a quadratic program using the buy and sell variables. In both of these methods, the penalty term of $p^T \|x - x_o\|$ appearing in the objective function of equation (15) is replaced by the expression ($p^T b$). In addition, b and s are required to satisfy equations (17). Using the first method, the remaining occurrences of x in the objective function, budget constraints, upper bounds, and lower bounds are replaced by the right hand side of equation (18). This results in a program with 2N decision variables with simple bounds, M linear equality constraints (the budget constraints), and 2N linear inequality constraints (the simple bounds on x). The objective function is a quadratic function of b and s. Using the second method, there is no substitution for x, and the three vectors x, b, and s are all treated as vectors of decision variables that are linked by equation (18). This results in a program with 3N decision variables with simple bounds and (M+N) equality constraints. In this case the objective function is a quadratic function of x, b, and s. It can be shown that since the penalty vector p is non-negative, that the complementarity condition does not need to be explicitly enforced. This is a result from the area of separable programming, which is described in H. P. Williams, *Model Building in Mathematical Programming*, 4th edition, John Wiley & Sons, New York, N.Y., 1999, and is hereby incorporated by reference. Hence both methods recover a quadratic program.

In the preferred embodiment, the quadratic program is recovered from a different and non-obvious change of decision variables. The vector of decision variables x is replaced by two vectors of decision variables v, the "immune" variable and w, the "penalty" variable, defined by the following equations:

$$v = \|x_o - l\| - \|x_o - x\|$$
$$= \min[x, x_o] - \min[l, x_o]$$
$$w = \|x - x_o\| - \|l - x_o\|$$
$$= \max[x, x_o] - \max[l, x_o]$$
(EQ #19)

The $i^{th}$ element of the vector min[x,y] (max[x,y]) is equal to the minimum (maximum) xvalue of $x_1$ and $y_i$, the $i^{th}$ elements of the vectors x and y. Note that v represents the amount of the target mix x that is both above the lower bound and is immune to the load penalty term, and that w represents the amount of the target mix x that is above the lower bound and is subject to the penalty term. The following three properties of the vectors v and w are consequences of equations (16) and the maximum and minimum bounds on the vector x:

$$0 \leq v \leq \min[u, x_o] - \min[l, x_o]$$

$$0 \leq w \leq \max[u, x_o] - \max[l, x_o]$$

$$(v - \|x_o - l\|)^T (w + \|l - x_o\|) = 0 \quad \text{(EQ #20)}$$

The first two properties are simple bounds on the feasible values v and w. Note that the lower bounds restrict the elements of v and w to non-negative values. The third property is a complementarity condition. Again, the financial implication of this constraint is to prevent a simultaneous sale and purchase of the same position in a portfolio. A last property of equations (20) is a formula for the original vector of decision variables x in terms of l, v, and w:

$$x = l + v + w \quad \text{(EQ #21)}$$

Using equation (21) and a feasible pair of immune-penalty vectors, a feasible value of the target mix vector can be constructed. In particular, if v* and w* are the optimal feasible vectors for a program in v and w, then the optimal portfolio mix x* can be computed.

The immune and penalty variables are used to recover a quadratic program for the load-aware portfolio optimization. The penalty term $p^T\|x-x_o\|$ appearing in the objective function of equation (15) is written in terms of w using the second of equations (19). Substituting the expression for the vector x given by equation (21) in the non-penalty terms yields an expression for the objective function as a function of v and w:

$$\Phi(v, w) = \Phi_o + \begin{bmatrix} q \\ q-p \end{bmatrix}^T \begin{bmatrix} v \\ w \end{bmatrix} - (1/\tau) \cdot \begin{bmatrix} v \\ w \end{bmatrix}^T \begin{bmatrix} C & C \\ C & C \end{bmatrix} \begin{bmatrix} v \\ w \end{bmatrix} \quad \text{(EQ #22)}$$

$$\Phi_o = p^T \|1 - x_0\| - (1/\tau) \cdot (1^T C l)$$

$$q = e - \delta - (2/\tau) \cdot (C l)$$

Note that the objective function is a quadratic function of the 2N decision variables given by the elements of the vectors v and w. The term $\Phi_o$ is a constant with respect to the optimization, and can be ignored. Similarly, x can be eliminated from the multiple-account budget constraints given by equations (14):

$$\begin{bmatrix} i_j \\ i_j \end{bmatrix}^T \begin{bmatrix} v \\ w \end{bmatrix} = g_j = f_j - i_j^T 1, \quad j \in \{1, \ldots, M\} \quad \text{(EQ #23)}$$

It is further noted that if the bounds on v and w given by equations (22) are satisfied, then the bounds on x are automatically satisfied. Again, it can be shown that since the penalty vector p is non-negative, that the complementarity condition does not need to be explicitly enforced. Therefore, equations (22) and (23), together with the bounds from equation (20) comprise a quadratic program in 2N decision variables with simple bounds and M linear equality constraint.

It is noted that it may not be necessary to use all 2N of the immune-penalty decision variables. If the $i^{th}$ financial product has no load, then the penalty variable $w_1$ corresponding to this product can always be set equal to zero and deleted from the problem. Also, if the $i^{th}$ financial product has a load and its lower bound is greater than or equal to its initial mix ($1_1 \leq x_{o,i}$), then the immune variable $v_i$ corresponding to this product is always equal to zero and can be deleted from the problem. This is the case for a financial product that is not currently held in a portfolio, but is being considered for purchase. Similarly, if the $i^{th}$ financial product has a load and its upper bound is less than or equal to its initial mix ($u_1 \leq x_{o,i}$), then the penalty variable $w_i$ corresponding to this product is always equal to zero and can be deleted from the problem. The latter two results are a direct consequence of the simple bounds in equations (20).

Using the immune-penalty variables has two advantages over using buy-sell variables. The first advantage is that the immune-penalty formulation is always of smaller dimension, i.e. it has either fewer constraints or fewer variables than either of the buy-sell formulations. Since storage and computation time increase as the number of variables and constraints increase, the immune-penalty variables are preferred.

When two problems are of the same form, the same computer software codes can be used to compute their solutions. Note that though two problems may have different dimensions, parameter values, and thus different solutions, they can still be of the same form. The differences are handled by prescribing different values for the input and output arguments of the computer software codes. It is noted that the objective function of equations (22), sans the constant term, is of the same form as the no-load objective function in equations (13). Further, the budget constraints given by equation (23) are of the same form as the multiple-account budget constraints for the no-load equation given by equations (14). The second advantage of the immune-penalty quadratic program is that it has exactly the same form as the no-load portfolio optimization, and can be implemented using the same standard software codes currently used for a no-load portfolio optimization.

It is noted that there exists other transformations of the decision variables with similar properties and advantages as the immune-penalty decision variables. Whereas the pair of vectors v and w is defined in terms of the lower bound l, an obvious equivalent is to define a pair of vectors in terms of the upper bound u. It is also noted that the above transformation techniques apply to portfolio optimization problems with general linear equality and inequality constraints in addition to the budget constraints. Any additional constraints are handled in the same spirit as the budget constraints.

In the preferred embodiment, the contributions into a portfolio are different for different accounts. For example, over a holding period a user's IRA account may have a yearly contribution of $2,000, whereas his SEP-IRA account may have a yearly contribution of $10,000. For a constant-mix portfolio consisting of one account, equations (10) were used to model the initial wealth, the increment of wealth, and contributions to the $i^{th}$ financial product. For multiple accounts with different contribution rates, equations (10) can be modified by replacing $C_{p,t}$ on the right hand side of the third equation by $(K_{j,t}/f_j)$ where j represents the account containing the $i^{th}$ financial product, $f_i$ is the $j^{th}$ account's fraction, and $K_{j,t}$ is the contribution to the $j^{th}$ account at the beginning of the $t^{th}$ time interval. The penalty and reductions terms for financial products with loads then follow using equations (9) and these modified equations.

Figure 6:
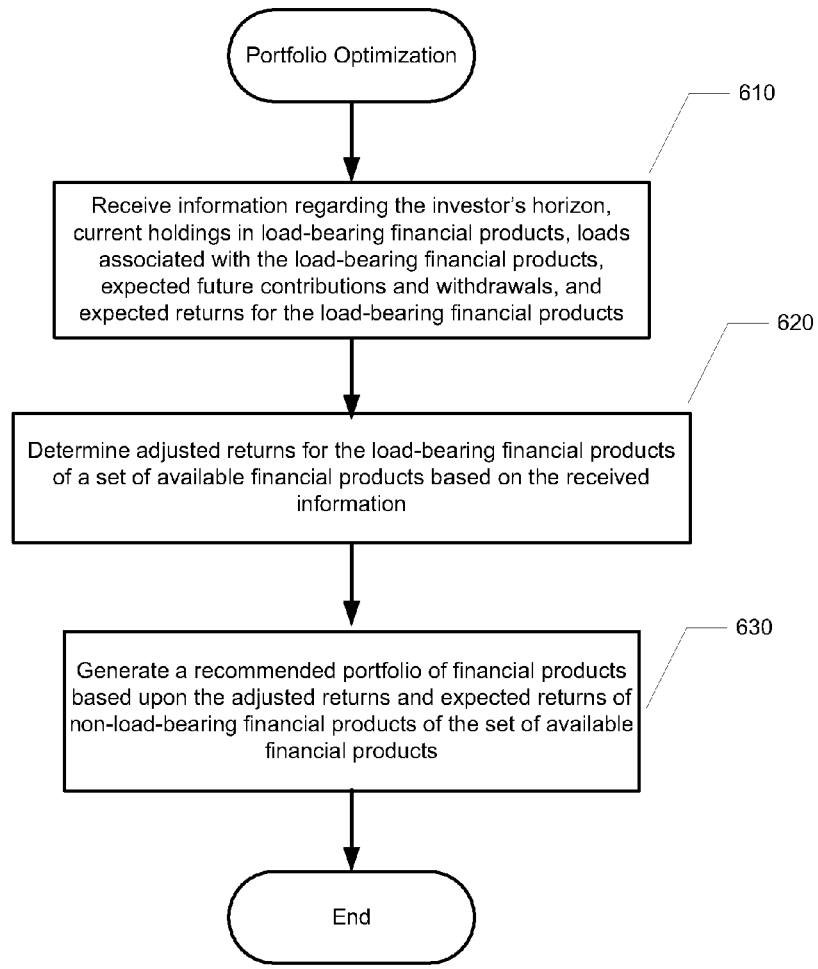
FIG. 6 is a more detailed flow diagram illustrating portfolio optimization according to one embodiment of the present invention.

FIG. 6 is a more detailed flow diagram illustrating portfolio optimization according to one embodiment of the present invention. According to the present example and as described above, at block 610 information regarding an investor's horizon, current holdings in load-bearing financial products, loads associated with the load-bearing financial products, expected future contributions and withdrawals and expected returns for the load-bearing financial products are received.

At block 620, adjusted returns are determined for the load-bearing financial products of the set of available financial products from which a recommended portfolio will be assembled.

At block 630, the recommended portfolio is generated based upon the adjusted returns and expected returns of non-load-bearing financial products of the set of available financial products.

Figure 7:
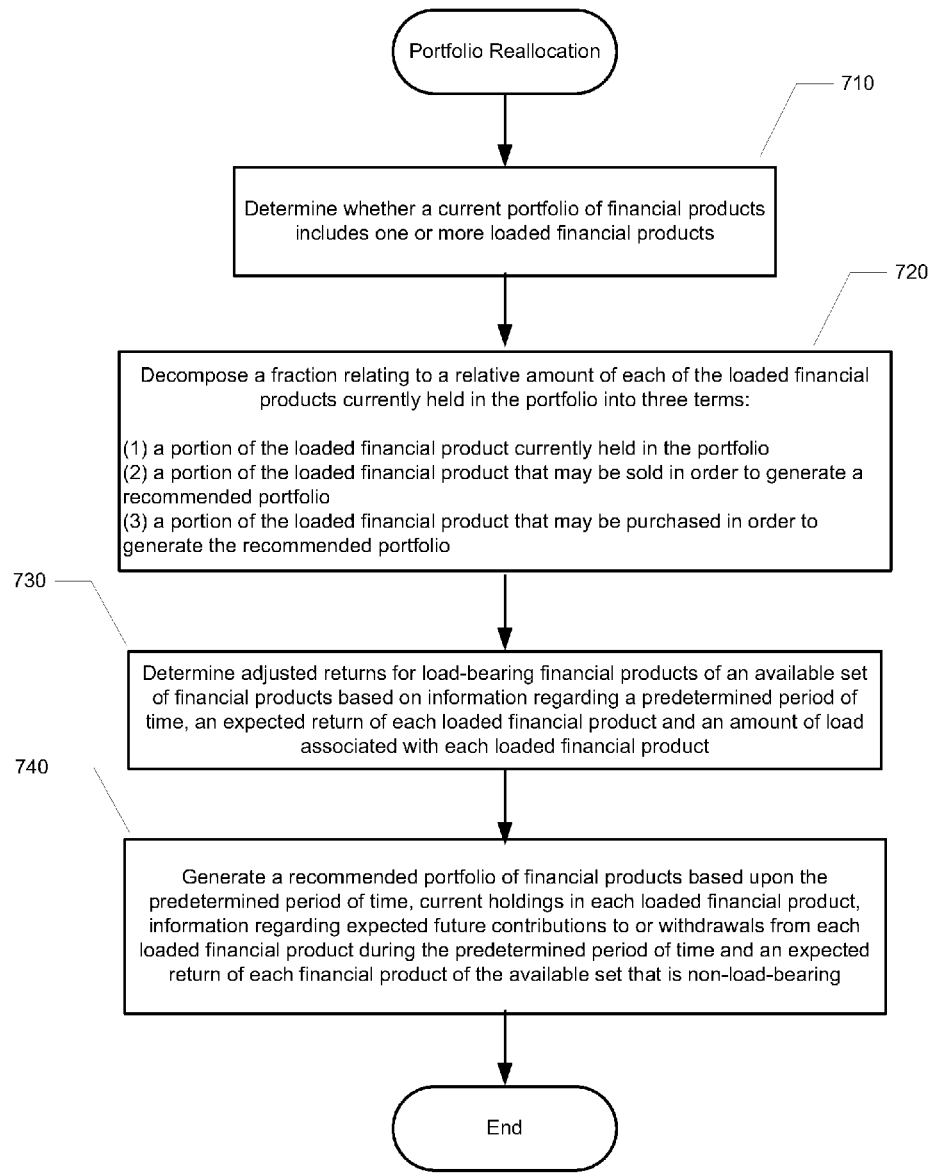
FIG. 7 is a flow diagram illustrating portfolio reallocation according to one embodiment of the present invention.

FIG. 7 is a flow diagram illustrating portfolio reallocation according to one embodiment of the present invention. In accordance with the present example, a determination is made regarding the existence of a loaded financial product in a current portfolio of financial products.

If it is determined that one or more loaded financial products form a part of the current portfolio, then at block 720 a fraction relating to a relative amount of each of the loaded financial products current held in the portfolio is decomposed into three terms, including a first term relating to a portion of the loaded financial product currently held in the portfolio, a second term relating to a portion of the loaded financial product that may be sold in order to generate a recommended portfolio and a third term relating to a portion of the loaded financial product that may be purchased in order to generate the recommended portfolio.

At block 730, adjusted returns are determined for load-bearing financial products of an available set of financial products from which the recommended portfolio will be assembled. According to one embodiment, the determination is based on information regarding a predetermined period of time, an expected return of each loaded financial product and an amount of load associated with each loaded financial product.

At block 740, a recommended portfolio of financial products is generated. In accordance with the present example, the recommended portfolio is based upon the predetermined period of time, current holdings in each loaded financial product, information regarding expected future contributions to and/or withdrawals from each loaded financial product during the predetermined period of time and an expected return of each financial product of the available set that is non-load bearing.

Figure 8:
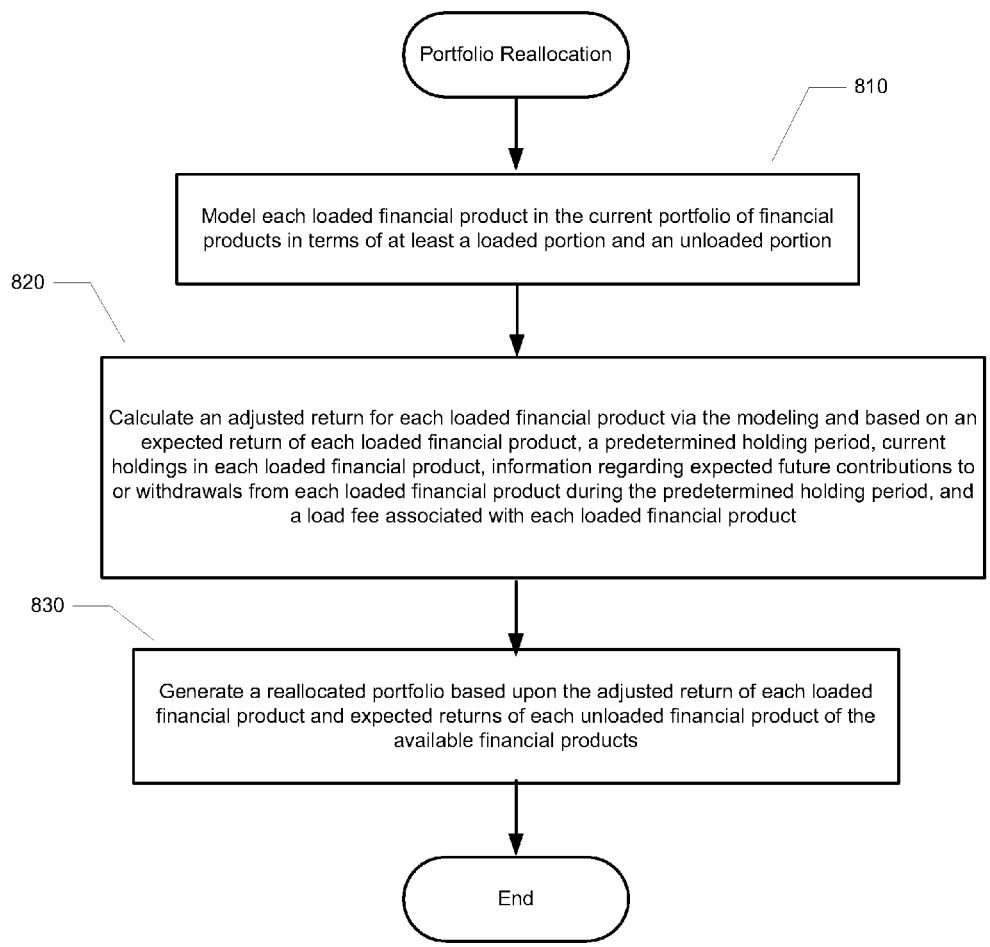
FIG. 8 is a flow diagram illustrating portfolio reallocation according to another embodiment of the present invention.

FIG. 8 is a flow diagram illustrating portfolio reallocation according to another embodiment of the present invention. In this example, at block 810, each loaded financial product in a current portfolio of financial products is modeled in terms of at least a loaded portion and an unloaded portion.

At block 820, an adjusted return is calculated for each loaded financial product via the modeling and based on an expected return of each loaded financial product, a predetermined holding period, current holdings in each loaded financial product, information regarding expected future contributions to and/or withdrawals from each loaded financial product during the predetermined holding period and a load fee associated with each loaded financial product.

At block 830, a reallocated portfolio is generated based upon the adjusted return of each loaded financial product and expected returns of each unloaded financial product of the available financial products.

Figure 9:
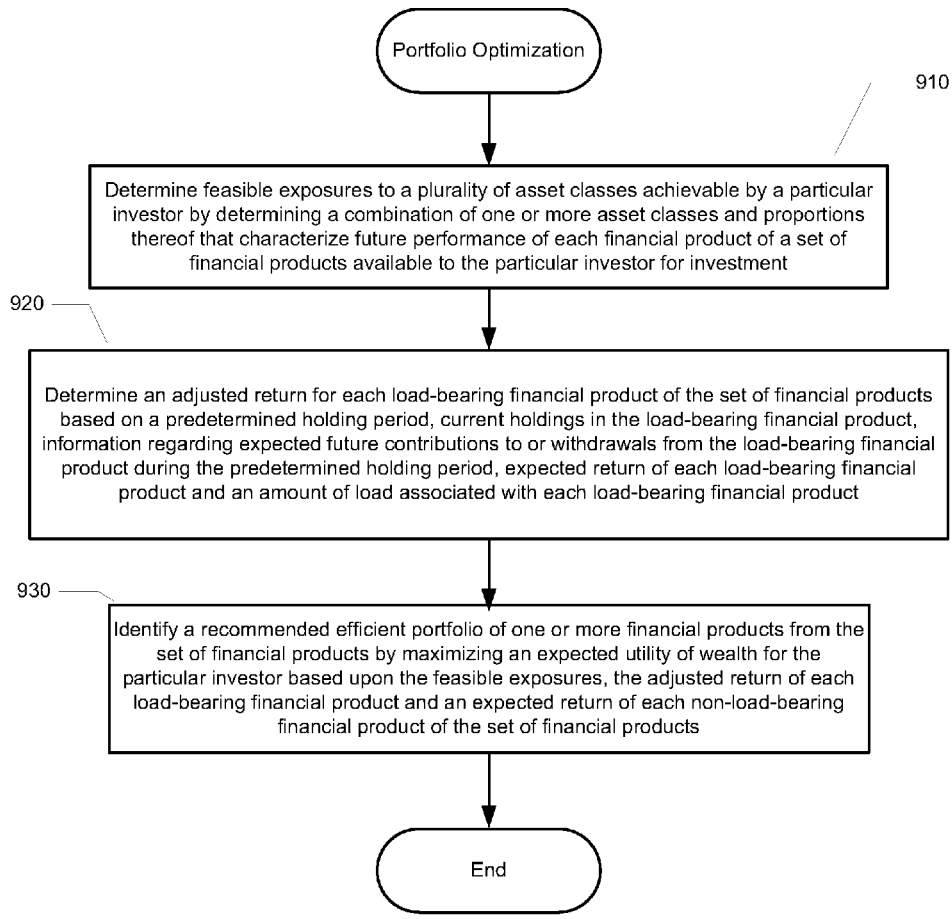
FIG. 9 is a more detailed flow diagram illustrating portfolio optimization according to another embodiment of the present invention.

FIG. 9 is a more detailed flow diagram illustrating portfolio optimization according to another embodiment of the present invention. In the present example, at block 910, feasible exposures to a plurality of asset classes that are achievable by a particular investor are determined by identifying a combination of one or more asset classes and proportions thereof that characterize future performance of each financial product of a set of financial products available to the particular investor for investment.

At block 920, an adjusted return is determined for each load-bearing financial product of the set of financial products based on a predetermined holding period, current holdings in the load-bearing financial product, information regarding expected future contributions to and/or withdrawals from the load-bearing financial product during the predetermined holding period, expected return of each load-bearing financial product and an amount of load associated with each load-bearing financial product.

At block 930, a recommended efficient portfolio of one or more financial products is identified from the set of financial products by maximizing an expected utility of wealth for the particular investor based upon the feasible exposures, the adjusted return of each load-bearing financial product and an expected return of each non-load-bearing financial product of the set of financial products.

Figure 10:
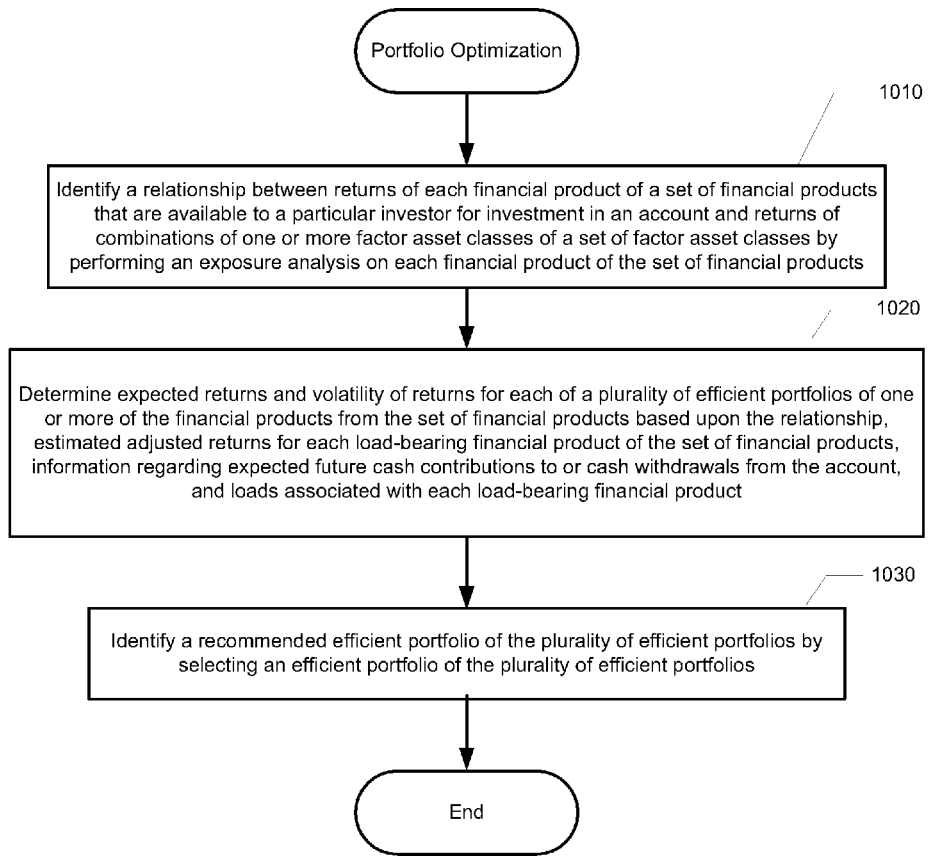
FIG. 10 is a more detailed flow diagram illustrating portfolio optimization according to yet another embodiment of the present invention.

FIG. 10 is a more detailed flow diagram illustrating portfolio optimization according to yet another embodiment of the present invention. In the present example, at block 1010, a relationship is identified between returns of each financial product of a set of financial products that are available to a particular investor for investment in an account and returns of combinations of one or more factor asset classes of a set of factor asset classes by performing an exposure analysis on each financial product of the set of financial products.

At block 1020, expected returns and volatility of returns are determined for each of a plurality of efficient portfolios of one or more of the financial products from the set of financial products based upon the relationship, estimated adjusted returns for each load-bearing financial product of the set of financial products, information regarding expected future cash contributions to and/or cash withdrawals from the account and loads associated with each load-bearing financial product.

At block 1030, a recommended efficient portfolio of the plurality of efficient portfolios is identified by selecting an efficient portfolio of the plurality of efficient portfolios.

ALEERNATIVE EMBODIMENTS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For instance, while the embodiments discussed herein relate primarily to performing portfolio optimizations where one or more financial products in a set of available financial products carry front-end loads, it is to be appreciated that the present invention is equally applicable to portfolio optimizations involving one or more financial products carrying back-end loads or optimizations involving a set of financial products including one or more financial products having front-end loads and one or more financial products having back-end loads. Additionally, in certain embodiments, the teaching provided herein can be utilized in the rebalancing of a portfolio comprising one or more loaded financial products; wherein no new financial products are made available and only the relative fractions of each product held in the portfolio are changed. Furthermore, embodiments of the invention have been discussed herein with regard to financial products but the invention is not limited to any specific type of financial product. The embodiments of the invention are applicable to any type of financial product that charges a load or the equivalent of a load.

What is claimed is:

1. A method of selecting a recommended portfolio of one or more financial products of a set of financial products, the method comprising:
   determining an adjusted return for each load-bearing financial product of the set of financial products based on a predetermined holding period, current holdings in the load-bearing financial product, information regarding expected future contributions to or withdrawals from the load-bearing financial product during the predetermined holding period, an expected return of the load-bearing financial product, and the amount of load associated with the load-bearing financial product; and
   generating the recommended portfolio of one or more financial products from the set of financial products in varying proportions based upon the adjusted return of each load-bearing financial product and an expected return of each non-load-bearing financial product of the set of financial products.

2. The method of claim 1, wherein one or more levels of risk may be specified by a user, indicating the user's risk tolerance, and wherein said generating the recommended portfolio is additionally based on the user's risk tolerance.

3. The method of claim 1, wherein said generating the recommended portfolio is additionally based upon a covariance of returns relating to the set of financial products.

4. The method of claim 3, wherein said generating the recommended portfolio includes using quadratic programming techniques to determine proportions of load-bearing and non-load-bearing financial products that maximize expected value of utility from the recommended portfolio, where the utility function is adequately approximated by a linear combination of the recommended portfolio's expected return and variance of return.

5. The method of claim 2, wherein the one or more levels of risk correspond to measures of volatility in a financial product's monetary value in response to changes in market conditions or a portfolio's monetary value in response to changes in market conditions.

6. A method of reallocating a portfolio of one or more financial products, the method comprising:
   determining whether the portfolio includes a loaded financial product;
   decomposing a fraction relating to a relative amount of the loaded financial product currently held in the portfolio into three terms, a first term being a known value representing a portion of the loaded financial product that is currently held in the portfolio, a second term being a variable representing a portion of the loaded financial product that may be sold in order to generate a recommended portfolio from the portfolio, and a third term being a variable representing a portion of the loaded financial product that may be purchased in order to generate the recommended portfolio from the portfolio and from a set of available financial products;
   determining an adjusted return for each loaded financial product of the set of available financial products and each loaded financial product contained within the portfolio based on a predetermined period of time, an expected return of each loaded financial product, and an amount of load associated with each loaded financial product; and
   generating the recommended portfolio of one or more financial products from the available set of financial products and from one or more financial products in the portfolio based on the predetermined period of time, current holdings in each loaded financial product, information regarding expected future contributions to or withdrawals from each loaded financial product during the predetermined period of time, and an expected return of each financial product that is non-load-bearing.

7. The method of claim 6, wherein a fraction relating to the relative amount of the loaded financial product proposed to be held in the recommended portfolio is decomposed into three terms, a first term being a known portion of the loaded financial product that is a specified lower/upper bound fraction representing a minimum/maximum portion of the loaded financial product that is recommended to be obtained in the recommended portfolio, a second term being a variable representing a portion of the loaded financial product that is above/below the lower/upper bound and is immune to an initial load fee, and a third term being a variable representing a portion of the loaded financial product that is above/below the lower/upper bound and is subject to an initial load fee.

8. The method of claim 7, wherein the first term associated with the recommended portfolio is based upon a user specified minimum or maximum allowed portion of the loaded financial product.

9. The method of claim 6, wherein said generating the recommended portfolio includes using quadratic programming techniques to determine proportions of load-bearing and non-load-bearing financial products that maximize expected value of utility from the portfolio, where the utility function is adequately approximated by a linear combination of the portfolio's expected return and variance of return.

10. The method of claim 9, wherein said generating the recommended portfolio is additionally based upon a covariance of returns relating to the set of available financial products.

11. The method of claim 9, wherein one or more levels of risk may be specified by a user, indicating the user's risk tolerance, and wherein said generating the recommended portfolio is additionally based on the user's risk tolerance.

12. A method of reallocating a portfolio of one or more financial products, the method comprising:
modeling each loaded financial product of the one or more financial products in terms of at least a loaded portion and an unloaded portion;
calculating an adjusted return for each loaded financial product via the modeling and based on an expected return of each loaded financial, a predetermined holding period, current holdings in each loaded financial product, information regarding expected future contributions to or withdrawals from each loaded financial product during the predetermined holding period, and a load fee associated with each loaded financial product; and
generating a reallocated portfolio based upon the adjusted return of each loaded financial product and expected returns of each unloaded financial product of the one or more financial products.

13. A method of financial product selection comprising:
calculating a plurality of adjusted returns by calculating an adjusted return for each of a plurality of loaded financial products of a set of financial products available to a particular investor for investment, the plurality of adjusted returns representing expected performance of the plurality of loaded financial products as a result of a corresponding load applied to each of the plurality of loaded financial products;
modeling each of the plurality of loaded financial products in the set of financial products available to the particular investor for investment in terms of at least a loaded portion and an unloaded portion, the loaded portion's performance described in terms of an associated adjusted return of the plurality of adjusted returns, and the unloaded portion's performance described in terms of an associated expected return of a plurality of expected returns of the plurality of loaded financial products; and
generating one or more portfolios of financial products from the set of financial products in varying proportions based upon expected returns of non-loaded financial products of the set of financial products, the adjusted returns of the plurality of loaded financial products, and the modeling.

14. The method of claim 13, wherein one or more levels of risk may be specified by the particular investor, indicating the particular investor's risk tolerance, and wherein said generating one or more portfolios is additionally based on the particular investor's risk tolerance.

15. The method of claim 14, wherein said generating one or more portfolios of financial products further comprises using quadratic programming techniques to determine combinations of financial products of the set of financial products, loaded portions of loaded financial products in the recommended portfolio, and unloaded portions of the loaded financial products in the recommended portfolio in varying proportions that have a highest expected return for a given level of risk.

16. The method of claim 13, wherein said generating one or more portfolios of financial products is additionally based upon covariance information relating to the set of financial products.

17. The method of claim 13, wherein said modeling each of the plurality of loaded financial products further includes representing at least one of the loaded financial products in the set of financial products available to the particular investor for investment as a sum of three terms, one of which indicates a minimum or maximum portion that each of the loaded financial products in the set of financial products available to the particular investor for investment should contribute to the one or more portfolios of financial products.

18. A machine-readable medium having stored thereon data representing sequences of instructions, which when executed by a processor, cause the processor to:
determinine an adjusted return for each load-bearing financial product of a set of available financial products based on a predetermined holding period, current holdings in the load-bearing financial product, information regarding expected future contributions to or withdrawals from each load-bearing financial product during the predetermined holding period, an expected return of each load-bearing financial product, and an amount of load associated with the load-bearing financial product; and
generate a recommended portfolio of one or more financial products from the set of financial products in varying proportions based upon the adjusted return of each load-bearing financial product and an expected return of each non-load-bearing financial product of the set of available financial products.

19. A computer system comprising:
a processor; and
a computer readable-medium containing instructions that when executed cause the processor to
calculate a plurality of adjusted returns by calculating an adjusted return for each of a plurality of loaded financial products of a set of financial products available to a particular investor for investment, the plurality of adjusted returns representing expected performance of the plurality of loaded financial products as a result of a corresponding load applied to each of the plurality of loaded financial products;
represent each of the plurality of loaded financial products in the set of financial products available to the particular investor for investment in terms of at least a loaded portion and an unloaded portion, the loaded portion's performance described in terms of an associated adjusted return of the plurality of adjusted returns, and the unloaded portion's performance described in terms of an associated expected return of a plurality of expected returns of the plurality of loaded financial products; and
generate one or more portfolios of financial products from the set of financial products in varying proportions based upon expected returns of non-loaded financial products of the set of financial products, the plurality of adjusted returns, and the representation of each of the plurality of loaded financial products in terms of at least a loaded portion and an unloaded portion.

20. A method comprising:
determining feasible exposures to a plurality of asset classes achievable by a particular investor by determining a combination of one or more asset classes of the plurality of asset classes and proportions of the one or more asset classes of the plurality of asset classes that characterize future performance of each financial product of a set of financial products available to the particular investor for investment;
determining an adjusted return for each load-bearing financial product of the set of financial products based on a predetermined holding period, current holdings in the load-bearing financial product by the particular investor, information regarding expected future contributions to or withdrawals from the load-bearing financial product during the predetermined holding period, and an expected return of each load-bearing financial product, and an amount of load associated with each load-bearing financial product; and
identifying a recommended efficient portfolio of one or more financial products form the set of financial products by maximizing an expected utility of wealth for the particular investor based upon the feasible exposures, the adjusted return of each load-bearing financial product of the set of financial products, and an expected return of each non-load-bearing financial product of the set of financial products.

21. The method of claim 20, further comprising modeling expected future asset class returns as a function of one or more economic factors by generating return scenarios for each asset class of the plurality of asset classes based upon future scenarios of the one or more economic factors.

22. The method of claim 20, wherein said determining a combination of one or more asset classes of the plurality of asset classes and proportions of the one or more asset classes of the plurality of asset classes that characterize future performance of each financial product of a set of financial products comprises performing returns-based style analysis.

23. The method of claim 20, wherein said determining a combination of one or more asset classes of the plurality of asset classes and proportions of the one or more asset classes of the plurality of asset classes that characterize future performance of each financial product of a set of financial products comprises surveying the underlying assets held in the financial product.

24. The method of claim 20, wherein said determining a combination of one or more asset classes of the plurality of asset classes and proportions of the one or more asset classes of the plurality of asset classes that characterize future performance of each financial product of a set of financial products comprises obtaining exposure information based on a target benchmark associated with each financial product of the set of financial products.

25. The method of claim 20, wherein said determining a combination of one or ore asset classes of the plurality of asset classes and proportions of the one or more asset classes of the plurality of asset classes that characterize future performance of each financial product of the set of financial products comprises categorizing exposures based on standard industry classification schemes.

26. The method of claim 20, further comprising forecasting a probability of the particular investor meeting an identified financial goal based upon the recommended efficient portfolio.

27. The method of claim 20, wherein the set of financial products available to the particular investor for investment comprises financial products offered through an employee-directed defined contribution plan.

28. A method comprising:
identifying a relationship between returns of each financial product of a set of financial products that are available to a particular investor for investment in an account and returns of combinations of one or more factor asset classes of a set of factor asset classes by performing an exposure analysis on each financial product of the set of financial products;
determining expected returns and volatility of returns for each of a plurality of efficient portfolios of one or more of the financial products from the set of financial products based upon the relationship, estimated adjusted returns for each load-bearing financial product of the set of financial products, information regarding expected future cash contributions to or cash withdrawals from the account, and loads associated with each load-bearing financial product; and
identifying a recommended portfolio of the plurality of efficient portfolios by selecting an efficient portfolio of the plurality of efficient portfolios.

29. The method of claim 28, further comprising:
forecasting returns associated with each core asset class of a set of core asset classes by generating core asset class scenarios based upon future scenarios of one or more economic factors with an equilibrium econometric model; and
forecasting returns associated with each factor asset class of the set of factor asset classes by generating factor model asset scenarios based upon the core asset class scenarios.

30. The method of claim 28, wherein said performing an exposure analysis on each financial product of the set of financial products comprises performing returns-based style analysis.

31. The method of claim 28, further comprising forecasting a probability of the particular investor meeting an identified financial goal based upon the recommended portfolio.

32. The method of claim 28, wherein said identifying a recommended portfolio further comprises maximizing an expected utility of wealth for the particular investor.

33. A method of reallocating a portfolio of one or more financial products, the method comprising:
a step for modeling each loaded financial product of the one or more financial products in terms of at least a loaded portion and an unloaded portion;
a step for calculating an adjusted return for each loaded financial product taking into consideration the loaded portion and the unloaded portion and based on an expected return of each loaded financial, a predetermined holding period, current holdings in each loaded financial product, information regarding expected future contributions to or withdrawals from each loaded financial product during the predetermined holding period, and a load fee associated with each loaded financial product; and
a step for generating a reallocated portfolio based upon the adjusted return of each loaded financial product and expected returns of each non-loaded financial product of the one or more financial products.

* * * * *